United States Patent [19]

Edwards et al.

[11] 3,880,889

[45] Apr. 29, 1975

[54] PHENANTHRENE-2-CARBOXYLIC ACIDS

[75] Inventors: John A. Edwards, Los Altos; John H. Fried, Palo Alto, both of Calif.

[73] Assignee: Syntex Corporation, Panama, Panama

[22] Filed: July 12, 1971

[21] Appl. No.: 161,932

Related U.S. Application Data

[62] Division of Ser. No. 638,648, May 15, 1967, Pat. No. 3,657,329.

[52] U.S. Cl. ........ 260/345.7; 260/345.8; 260/347.3; 260/347.4; 260/468 S; 260/488 CD; 260/514 S; 260/240 K
[51] Int. Cl. ....................... C07c 65/18; C07c 65/20
[58] Field of Search ............... 760/408.5, 314.5, 488

[56] References Cited
UNITED STATES PATENTS

| | | | |
|---|---|---|---|
| 3,312,717 | 4/1967 | Baren | 260/343.2 |
| 3,657,329 | 4/1972 | Edwards et al. | 260/514.5 |
| 3,702,853 | 11/1972 | Edwards et al. | 260/343.3 |

OTHER PUBLICATIONS

Fiesen et al., Steroids, p. 442 (1959).

Primary Examiner—Robert Gerstl
Attorney, Agent, or Firm—Tom M. Moran; Joseph I. Hirsch; Walter Dreger

[57] ABSTRACT

Processes and intermediates for the synthesis of cis and trans racemates of phenanthrene-2-carboxylic acids.

11 Claims, No Drawings

PHENANTHRENE-2-CARBOXYLIC ACIDS

This is a division of application Ser. No. 638,648 filed May 15, 1967 now U.S. Pat. No. 3,657,329.

The present invention relates to novel processes and novel intermediates useful for the synthesis of phenanthrene-2-carboxylic acids. More particularly, this invention relates to novel processes for the synthesis of cia and trans racemates of a phenanthrene-2-carboxylic acid and derivatives therefor having the general formula A':

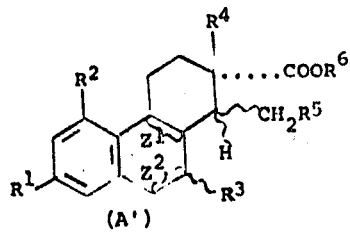

(A')

wherein each of $Z^1$ and $Z^2$ is a carbon-carbon single bond or carbon-carbon double bond, provided that $Z^1$ is a carbon-carbon double bond when $Z^2$ is a carbon-carbon double bond;

$R^1$ is hydrogen, hydroxy, lower alkoxy, cyclopentyloxy, cyclohexyloxy, tetrahydropyran-2'-yloxy, tetrahydrofuran-2'-yloxy or lower acyloxy;

$R^2$ is hydrogen, hydroxy, lower alkoxy, cyclopentyloxy, cyclohexyloxy, tetrahydropyran-2'-yloxy, tetrahydrofuran-2'-yloxy, lower acyloxy or lower alkyl;

$R^3$ is hydrogen, methyl or ethyl;

$R^4$ is methyl, ethyl, or propyl;

$R^5$ is hydrogen, methyl, ethyl or propyl; and $R^6$ is hydrogen, potassium, sodium or lower alkyl, provided that when $R^6$ is potassium or sodium that each of $R^1$ and $R^2$ is other than lower acyloxy.

The term "lower alkyl," as used herein, means a straight or branched chain hydrocarbon group of up to six carbon atoms, inclusive, such as methyl, ethyl, isopropyl, n-hexyl, and the like. The term "lower alkoxy" means the group —OAlk wherein Alk is lower alkyl as defined hereinabove. The term "lower acyloxy" or "lower acyl" means a hydrocarbon carboxylic acyloxy or acyl group containing up to six carbon atoms, inclusive, and is of a straight or branched chain structure such as acetoxy propionoxy, trimethylacetoxy, acetyl, propionyl, butyryl, and the like. The wavy lines "?" at the 1-position of the phenanthrene nucleus indicates alpha or beta configuration, i.e., the dl-cis and dl-trans isomers of the above formula. The wavy line "?" at the 10-position of the phenanthrene nucleus indicates alpha or beta configuration for the $R^3$ substituent.

An object of the present invention is to provide efficient processes for the synthesis of cis and trans racemates of a phenanthrene-2-carboxylic acid and derivatives therefor of the above formula A'. Another object is to provide valuable key intermediates having the desired stereochemistry for the preparation of these acids and derivatives thereof. Another object is the preparation of novel phenanthrene-2-carboxylic acids and esters and salts thereof. Additional objects and other meritorious features of the present invention will become apparent as the invention is described hereinafter in detail and from the appended claims.

In accordance with the present invention, compounds of Formula A' above are prepared according to the processes outlined in Chart B below.

CHART B

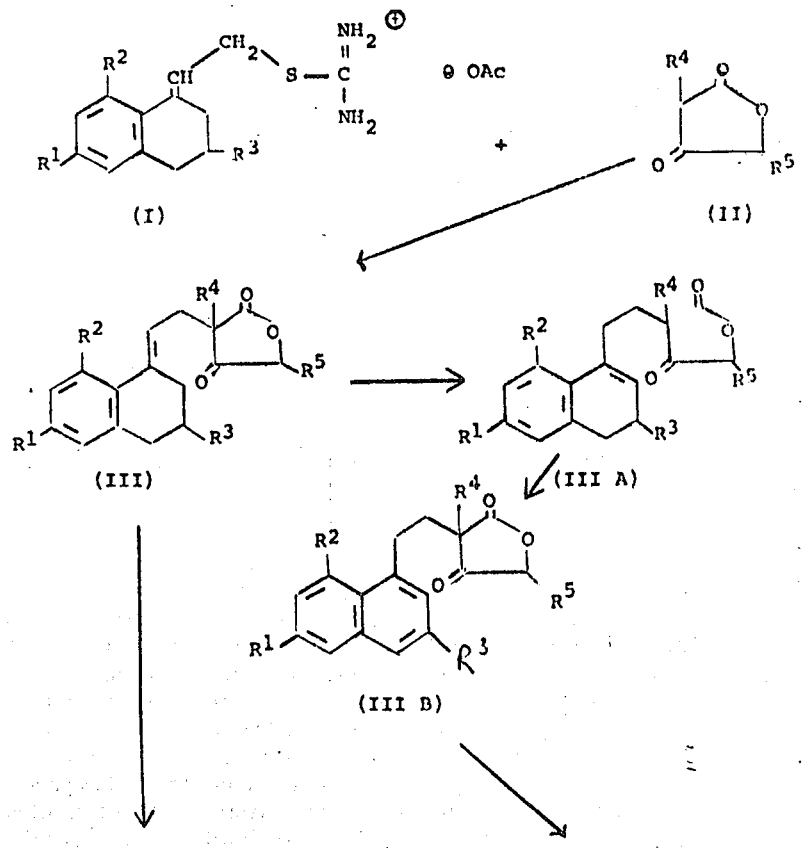

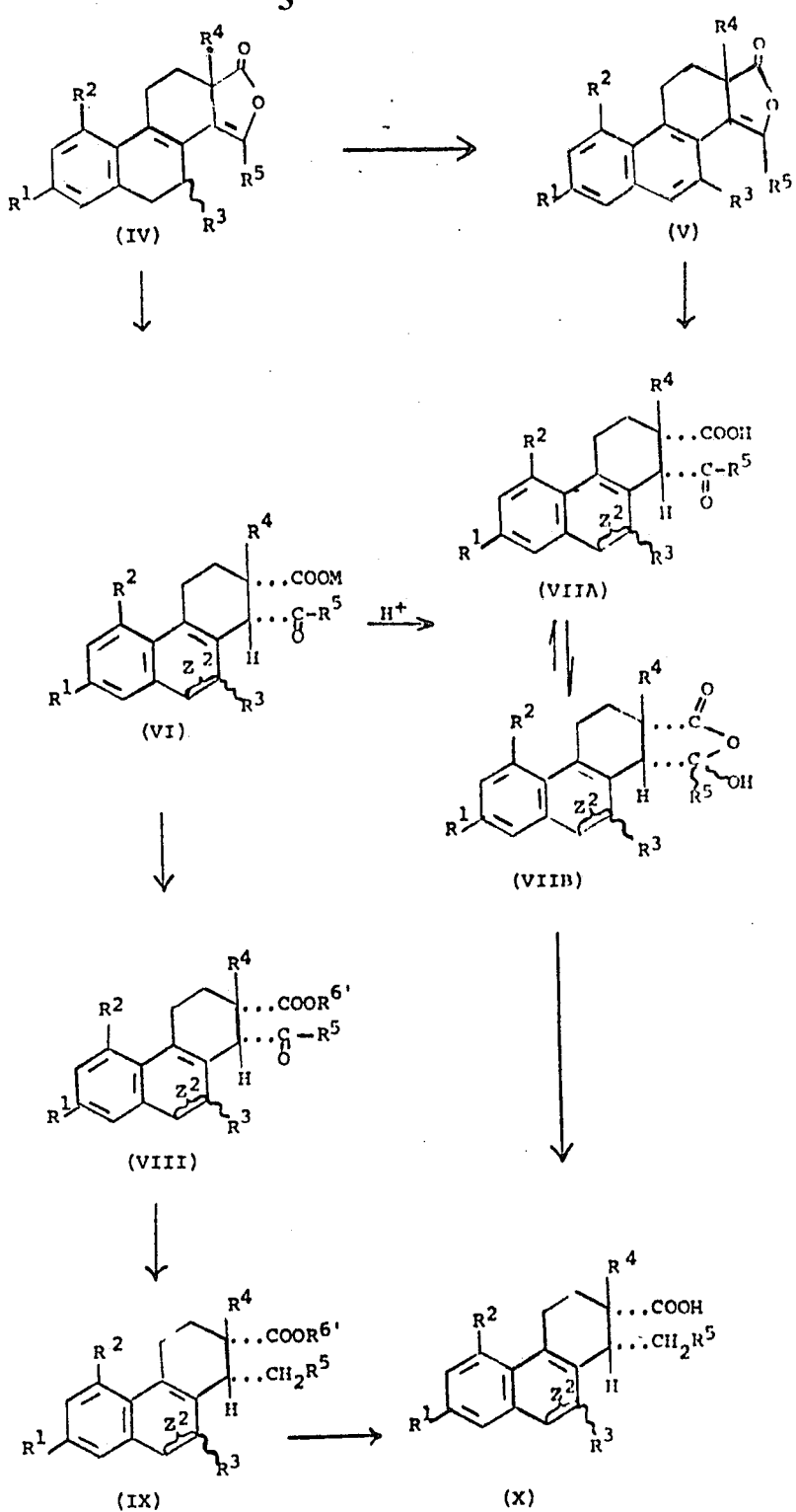

wherein M is potassium or sodium; $R^{6'}$ is lower alkyl; and all other substituents are as defined hereinabove.

In the practice of the processes as outlined in Chart B, an isothiouronium acetate salt of formula I is commingled with, and reacted with, a tetronic acid of formula II in an aqueous solution of a water-miscible organic solvent such as methanol, ethanol, diethylene glycol monoethyl ether, diethylene glycol dimethyl ether, tetrahydrofuran, and the like, at about room temperature for a period of from about 1 to 40 hours to afford a tricyclic compound of formula III. Preferably, the isothiouronium salt is condensed with the tetronic acid at room temperature in aqueous ethanol for a period of about 16 hours. Treatment of the tricyclic compound III in chloroform, or the like containing a trace of acid, e.g., hydrochloric acid, furnishes the tricyclic compound IIIA.

A tricyclic compound of formula III, IIIA, or a mixture thereof is then contacted with an acid, preferably a strong acid, either alone or in an organic solvent inert to the reaction such as benzene, xylene, dioxane, and the like at a temperature of from about room temperature to the reflux temperature of the solvent for a period of about 1 to 12 hours to form a tetracyclic enol lactone of formula IV. Exemplary of the inorganic and organic acids suitable for this reaction are p-toluenesulfonic acid, sulfosalicyclic acid, anhydrous orthophosphoric acid, sulfuric acid, formic acid, and the like. Preferably, this ring cyclization is effected by treatment with p-toluenesulfonic acid in benzene at reflux for about four hours.

A tetracyclic enol lactone of formula (IV) is then converted into either the corresponding 9,10-dehydro compound (V) or a keto acid salt of formula (VI) (VI, $Z^2$ is a single bond).

Conversion of a tetracyclic enol lactone (IV) into the corresponding 9,10-dehydro (V) is accomplished by heating the tetracyclic enol lactone in an organic solvent inert to the reaction in the presence of a palladium catalyst such as palladium on charcoal, palladium on barium sulfate, and the like, either alone or in the presence of a hydrogen acceptor such as maleic acid or the like. Suitable organic solvents include benzene, xylene, and the like. The 9,10-dehydro compound V can also be obtained by ring cyclization of the novel tricyclic compound IIIB by treatment with an acid as described in connection with III, IIIA and mixtures thereof. The compound of formula IIIB is obtained by treating a compound of formula IIIA in an inert organic solvent, e.g., benzene, with a palladium catalyst and optionally in the presence of a hydrogen acceptor such as maleic acid or the like.

Conversion of a tetracyclic enol lactone of formula (IV) into a novel cis keto acid salt of formula (VI) (VI, $Z^2$ is a single bond) is carried out by treatment with an aqueous water-miscible organic solvent solution of a base such as the alkali metal hydroxides, and the like at about room temperature for a period of the order of about 1 to 3 hours. In this conversion, caution must be exercised with regard to the reaction time in that by using a reaction time of 3 hours or less there is obtained the cis keto acid salt whereas reaction times extending beyond about 3 hours lead to formation of the trans keto acid salt, or in other words, formation of the trans keto acid salt is increasingly promoted as the reaction time extends beyond 3 hours.

Similarly, a 9,10-dehydro of the tetracyclic enol lactone of formula IV, i.e., a compound of formula V is converted into a novel cis keto acid salt of formula VI wherein $Z^2$ is a double bond by treatment with an aqueous water-miscible organic solvent solution of a base. In this conversion, there is preferably used an aqueous ethanolic solution of sodium hydroxide at about room temperature for from about 1 to about 3 hours; however, in the case of formula V wherein $R^1$ is methoxy, $R^4$ and $R^5$ are methyl and $R^2$ and $R^3$ are hydrogen, reaction times of about 1 to about 24 hours or longer can be used and in which case the corresponding cis keto acid sodium salt of formula VI precipitates out as an insoluble salt.

In carrying out the reactions outlined above (VI → VIII → IX → X), a cis keto acid salt of formula VI is first subjected to esterification to obtain a cis keto ester of formula VIII. The esterification is accomplished by treatment of a compound of formula VI with a lower alkyl halide, preferably a bromide or iodide, containing up to six carbon atoms, e.g., methyl iodide, methyl bromide, and the like, in an organic solvent such as dimethylacetamide or dimethylformamide at about room temperature for from about 1 to about 10 hours.

A cis keto ester of formula VIII is then subjected to carbonyl reduction. Carbonyl reduction of the cis keto ester can be accomplished by, for example, a Wolff-Kishner reduction, a Clemmensen reduction, thioketal formation followed by treatment with Raney nickel, or an electrochemical reduction in an electrolytic cell. For example, a cis keto ester of formula VIII is treated with a mixture of hydrazine hydrate and hydrazine hydrochloride in diethylene glycol diethyl ether at about 145°C for a period of about 3 hours to afford an intermediate hydrazone. The latter intermediate is then treated with potassium hydroxide in ethylene glycol at about 180°C or diethylene glycol at about 220°C to afford a cis acid (X). Alternatively, a cis keto ester is reduced with amalgamated zinc and an acid such as hydrochloric acid, acetic acid or the like, to afford a cis ester of formula IX. Alternatively, a cis keto ester is treated with ethanedithio at room temperature in the presence of boron trifluoride etherate, either alone or in an acetic acid solution, to afford a thioketal intermediate. Desulfurization of the latter intermediate with Raney nickel affords the cis ester (IX).

In the electrochemical method, reduction of a cis keto ester of formula VIII is effected at the cathode of a divided electrolysis cell in an electrolytic medium comprising mineral acid electrolyte, water and a water-miscible inert organic solvent at a current density of about 0.01 to about 0.2 amps./cm.$^2$ and at a temperature of from about 0°C to about 70°C, for a period of about 1 to about 16 hours. Mineral acids suitable for the electrolytic medium are sulfuric acid, hydrochloric acid, perchloric acid, hydrobromic acid, phosphoric acid, and the like. Preferably, sulfuric acid or perchloric acid. Water-miscible organic solvents inert to the electrolysis reaction suitable for the electrolytic medium are ethers such as dioxane, tetrahydrofuran, and the like, lower monohydric alcohols such as methanol, ethanol, and the like, lower alkylene glycols such as ethylene glycol, propylene glycol, and the like, mixtures of the foregoing solvents, and the like in which the cis keto ester is soluble or substantially soluble.

The amount of solvent present in the electrolytic medium can range from that amount which is sufficient to dissolve or substantially dissolve the keto ester up to about 94%, preferably from about 20 to about 85%, by weight, of the total electrolytic medium. The amount of acid in the medium can range from about 1 to about 20%, by weight, of the total electrolytic medium, preferably from about 2 to about 15%. The amount of water in the medium should be at least 5% by weight, of the total electrolytic medium, preferably from about 10 to about 75%. A preferred medium is an equal volume of the inert organic solvent and an equal volume of 10 to 30% aqueous sulfuric acid, by weight.

Cathode materials useful in the process of the electrochemical reduction include the high hydrogen overvoltage materials such as lead, cadmium, mercury, and the like. The cathode may be in any number of physical forms but preferably in a form having a high surface such as a sheet or a wire mesh which is sufficiently rigid to be used as a stirring means. Anode materials useful for this reduction are difficultly oxidizable conductors such as carbon, platinum, iron, lead, and the like. In general, the anode material may be any conductor which is not attacked by the electrolytic medium in a manner which would transform it into a soluble state over a short period.

In reducing the cis keto ester electrochemically a current density of about 0.01 to about 0.2 amps./cm.², preferably from about 0.02 to about 0.1 can be used. Depending primarily upon the current efficiency of the system, reduction times of about 1 to about 16 hours are generally employed. A temperature within the range of about 5°C to about 40°C is preferred.

Of the foregoing carbonyl reduction methods, the electrochemical reduction is preferably used for the reduction of the cis keto ester to the cis ester of formula IX.

The cis ester of Formula IX is then converted into the cis acid of formula X by alkaline hydrolysis. This conversion can be accomplished by treatment with an alcoholic solution of an alkali metal hydroxide such as sodium hydroxide or potassium hydroxide in methanol or ethanol at an elevated temperature, for example, about 180°C, for a few minutes to several hours, for example, from about 30 minutes to about 4 hours or more followed by acidification with an inorganic or organic acid, e.g., an aqueous solution of hydrochloric acid.

An ester of formula IX or an acid of formula X wherein $Z^2$ is a carbon-carbon single bond can be reduced to provide the corresponding 1,2,3,4,9,10,11,12-octahydro compound of formula A' wherein each of $Z^1$ and $Z^2$ is a single bond and $R^7$ is lower alkyl or hydrogen. This reduction can be carried out using an alkali metal such as metallic potassium or sodium in liquid ammonia.

As an alternative to the above described route (VI → VIII → IX → X) for preparation of the phenanthrene-2-carboxylic acids of formula X, there can be used the route outlined in Chart B above of VI → VII(A + B) → X.

In carrying out the reactions outlined above of VI → VII (A + B) → X, a cis keto acid salt of formula VI is acidified with an organic or inorganic acid to afford an equilibrium mixture of a tautomeric cis keto acid of formula VIIA and cis lactol of formula VIIB. This equilibrium mixture is predominantly the cis lactol and for the sake of clarity and to avoid undue prolixity hereinafter reference to the cis lactol is understood to be inclusive of the cis keto acid, i.e., the equilibrium mixture. This conversion or acidification can be carried out using, for example, an aqueous solution of an organic or inorganic acid such as an aqueous solution of hydrochloric acid or the like at about room temperature. This conversion or acidification can be carried out by treating either an isolated cis keto acid salt of formula VI or by acidification of the reaction medium in which VI is present after treating a compound of formula IV or V with an alkali metal hydroxide and thereafter isolating a thus-obtained cis lactol.

A cis lactol of formula VII is then subjected to carbonyl reduction to afford a cis acid of formula X. This carbonyl reduction can be carried out using, for example, the carbonyl reduction methods described hereinabove in the conversion of a compound of formula VIII into a compound of formula IX. Preferably, the cis lactol is subjected to carbonyl reduction by the electrochemical means described above.

In the practice of the processes as outlined in Chart B, acid labile groups in a compound of formula I or III, i.e., wherein either $R^1$ or $R^2$ or both is a tetrahydropyran-2'-yloxy or tetrahydrofuran-2'-yloxy group, are generally hydrolyzed in the course of the condensation and ring cyclization reactions to free hydroxy groups. The free hydroxy group (s) is reetherified subsequently, if desired, by treatment with dihydropyran or dihydrofuran and an acid catalyst such as p-toluenesulfonic acid either alone or in a cosolvent such as benzene to yield the corresponding 1- or 3-mono or 1,3-ditetrahydropyran-2'-yloxy or -tetrahydrofuran-2'-yloxy substituted enol lactone of formula IV.

In addition, base labile groups in a compound of formulas IV, V or IX, i.e., wherein either $R^1$ or $R^2$ or both is a hydrocarbon carboxylic acyloxy group, are hydrolized in the course of the alkaline hydrolysis reactions to free hydroxy groups which are reesterified subsequently, if desired.

In addition, acid labile groups in a compound of formulas VII (A and B) or VIII i.e., wherein either $R^1$ or $R^2$ or both is tetrahydropyran-2'-yloxy or tetrahydrofuran-2'-yloxy are hydrolyzed groups. The free hydroxy groups are reetherified subsequently, if desired, as described hereinabove.

In another aspect of the present invention, compounds of the formula A' above are prepared according to the process outlined in Chart C below wherein X is bromo or chloro and all other substituents are as defined hereinabove.

Chart C

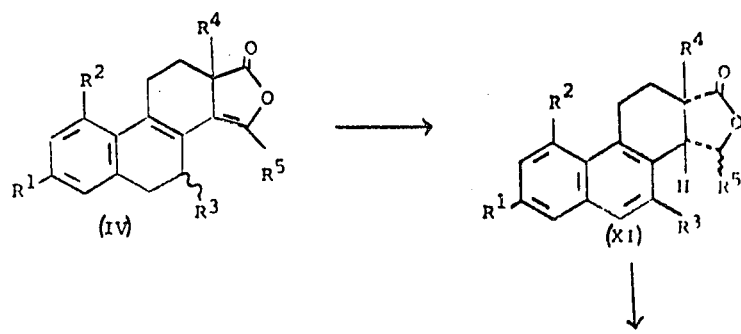

Chart C—Continued

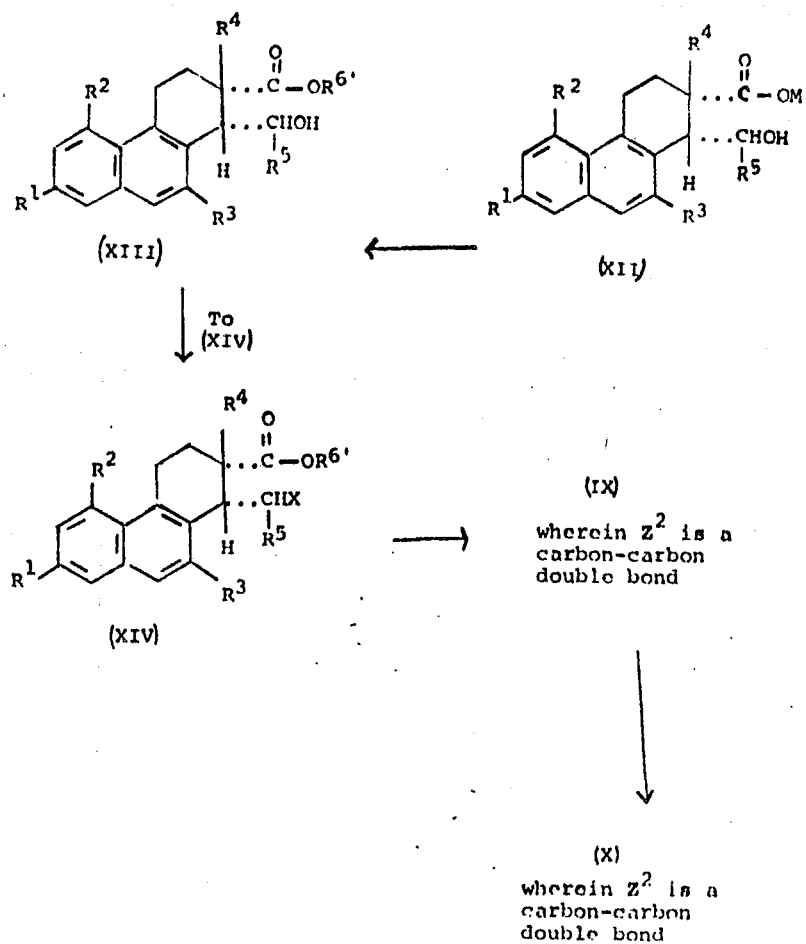

(IX) wherein $Z^2$ is a carbon-carbon double bond (X) wherein $Z^2$ is a carbon-carbon double bond In the practice of the process as outlined in Chart C, a tetracyclic enol lactone of formula IV is dehydrogenated using a palladium catalyst, e.g., palladium-on-charcoal and the like at an elevated temperature of about 180°C and in the absence of a solvent to afford a novel 14β-H lactone of formula XI.

Alkaline hydrolysis of a 14β-H lactone of formula XI with for example, an alcoholic solution of an alkali metal hydroxide such as sodium hydroxide or potassium hydroxide in methanol or ethanol, at an elevated temperature of about 140°C to about 180°C in a closed system, e.g., a sealed tube, affords an alkali metal salt of a cis hydroxy acid of formula XII.

Esterification of a cis hydroxy acid of formula XII with, for example, a lower alkyl halide by a procedure such as described hereinabove affords a corresponding cis hydroxy ester of formula XIII.

Halogenation, i.e., bromination or chlorination, of a cis hydroxy ester of formula XIII with a halogenating agent such as phosphorous tribromide, thionyl chloride and the like, either alone or in an inert organic solvent such as benzene for a period of time such as about 2 to about 18 hours at about room temperature to about 80°C affords a corresponding cis halo ester of formula XIV.

Hydrogenolysis of a cis bromo or chloro ester of formula XIV by treatment with a palladium catalyst, e.g., palladium-on-charcoal or the like, in a solvent such as ethyl acetate, an alcoholic solvent or the like containing a base such as trimethyl amine, ammonia, or the like, yields a cis ester of formula IX (IX, $Z^2$ is a carbon-carbon double bond).

Hydrolysis of a cis ester of formula IX, e.g., as described hereinabove, affords a free cis acid of formula X (X, $Z^2$ is a carbon-carbon double bond).

In the practice of the process as outlined in Chart C, acid labile groups in a compound of formula XIII, i.e., wherein either $R^1$ or $R^2$ or both is the tetrahydropyran-2'-yloxy or tetrahydrofuran-2'-yloxy group, are hydrolyzed in the course of the halogenation reaction to free hydroxy groups. The free hydroxy group (s) is reetherified subsequently, if desired by treatment with dihydropyran or dihydrofuran and an acid catalyst such as p-toluenesulfonic acid either alone or in a consolvent such as benzene to yield the corresponding 5 or 7 mono or 5,7-ditetrahydropyran-2'-yloxy or tetrahydrofuran-2'-yloxy substituted cis bromo or chloro esters of formula XIV.

In addition, base labile groups in a compound of formula XI or IX wherein $Z^2$ is a carbon-carbon double bond, i.e., wherein either $R^1$ or $R^2$ or both is the hydrocarbon carboxylic acyloxy group, are hydrolyzed in the course of the alkaline hydrolysis reactions to free hydroxy groups which are reesterified subsequently, if desired.

As an alternative to the processes outlined in Charts B and C, a tetracyclic enol lactone of formula V can be converted directly to a cis acid of formula X, (X, $Z^2$ is a carbon-carbon double bond). For example, catalytic hydrogenation of a enol lactone of formula V with a platinum oxide catalyst in ethyl acetate solvent at room temerature for a period of about 18 hours affords a mixture of a 14β-H lactone of formula XI and a cis acid of formula X, wherein $Z^2$ is a carbon-carbon double bond. The mixture is conveniently separated by, for example, preparative column chromatography.

In another alternative to the processes outlined in Charts B and C, a cis keto ester of formula VIII, a trans isomer thereof or a mixture of the two can be converted either separately or together to a cis acid of formula X. For example, reduction of a cis keto ester of formula VIII, the trans isomer thereof or a mixture of the two, with an alkali metal borohydride such as sodium borohydride, potassium borohydride and the like, in an inert organic solvent such as tetrahydrofuran, dioxane and the like, at room temperature for a period of about 1 to 24 hours, affords a corresponding cis hydroxy ester (XVI), the trans isomer thereof (XVII) or a mixture of the two.

from the borohydride reduction, as described hereinabove, can be converted to a cis or trans acid of formula X by a series of reactions, as described in Chart C, i.e., XIII → XIV → IX → X, depending upon whether the hydroxy ester (XVI), (XVII) or a mixture thereof is used.

In still another aspect of the present invention, a process which is especially useful for the preparation of trans racemates of formula A' is to treat a tetracyclic enol lactone of either formula IV or V with an aqueous water-miscible organic solvent solution of an alkali metal hydroxide e.g., sodium or potassium hydroxide, at about room temperature for a period of about 36 hours to about 48 hours to obtain a trans keto acid of formula XX together with a minor amount of an equilibrium mixture of the cis racemates of formula VII (A and B). The trans keto acid can be isolated at this point, if desired, by fractional crystallization.

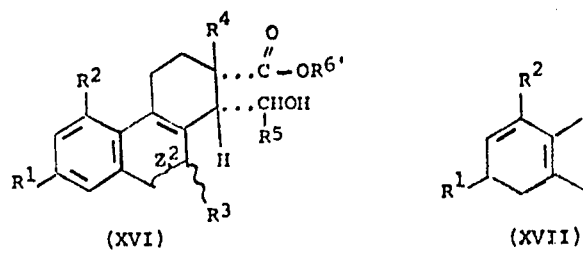

(XVI)　　　(XVII)

Dehydration of a cis hydroxy ester (XVI), the trans isomer thereof (XVII) or a mixture of the two, by treatment with phosphorus oxychloride in pyridine at a low temperature such as about 0° to 20°C for a period of about 1 to 24 hours or at an elevated temperature such as about 50°C for a shorter period of time, affords a corresponding unsaturated ester of formula XVIII:

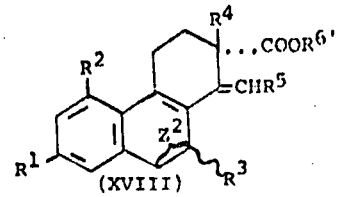

(XVIII)

Catalytic hydrogenation of this unsaturated ester (XVIII) such as with a nickel catalyst, e.g., Rupe nickel, affords the cis ester of formula IX which is subsequently converted by alkaline hydrolysis such as described hereinabove, to the cis acid of formula X. Alternatively, the unsaturated ester of formula XVIII can be first converted to a corresponding unsaturated acid of formula XIX by alkaline hydrolysis by the procedure described hereinabove and then the unsaturated acid of formula XIX catalytically hydrogenated, e.g., with a nickel catalyst, by the procedure described above to afford a cis acid of formula X.

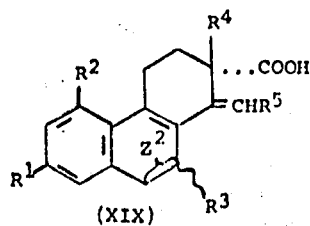

(XIX)

As a further alternative, a hydroxy ester obtained

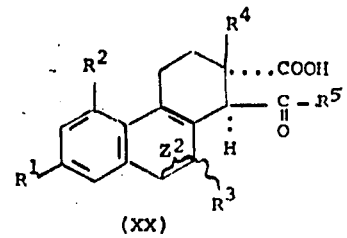

(XX)

Thereafter, by repeating the procedures described hereinabove using the thus-obtained trans racemate of formula XX as the starting material, there is obtained the trans acid of formula X, that is

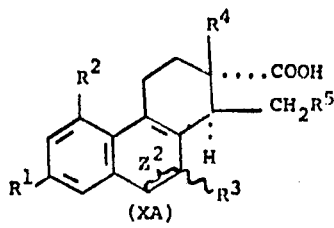

(XA)

This conversion of XX → XA can be accomplished using the carbonyl reduction procedures described hereinabove in connection with chart B. Thereafter, treatment of the trans racemate (XA) according to the procedure of U.S. Pat. No. 2,570,582 affords an enriched mixture of the cis acid of formula X which is therapeutically more active than the trans racemate (XA).

The phenanthrene -2-carboxylic acids and intermediates therefor described herein are obtained in the form of their dl-mixtures which can be resolved, if desired, by methods known in the art. For example, the acids form salts with optically active amines such as brucine, cinchonine, methylamino, morphine, quindine, quinine and strychnine. Fractional crystallization of the resulting diasteriomeric salts followed by regeneration of the free acids affords the individual d and l enantiomorphs.

The starting materials of formula I wherein $R^2$ is hydroxy, lower alkoxy, lower alkyl, cyclopentyloxy, cyclohexyloxy, lower acyloxy, tetrahydropyran-2'-yloxy or tetrahydrofuran-2'-yloxy; and $R^3$ is methyl or ethyl, can be prepared from a tetralone of the formulas:

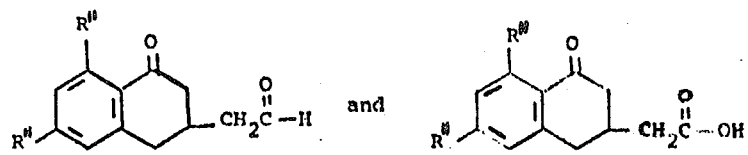

wherein R'' is hydrogen, hydroxy, lower alkyl or lower alkoxy. See U.S. Pat. No. 3,102,914.

Conventional modifications are performed on the substituent at the 3-position of the tetralone to afford either a 3-methyl or 3-ethyl substituent. For example, oxidation of the

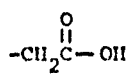

substituent by treatment with load tetraacetate in the presence of an alkali halide such as NaBr or LiCl in an inert organic solvent such as benzene at reflux for about 4 hours affords the corresponding 3-halo substituent. Catalytic reduction of this —CH$_2$X substituent using palladium-on-charcoal affords a 3-methyl substituent.

The 3-ethyl tetralones can be prepared for example, by first protecting the keto group as an ethylenedioxy group, second converting the acid group to a corresponding acid chloride by treatment with thionyl chloride. Reduction of the latter via a Rosenmund reduction affords an aldehyde which can then be converted by Wolff-Kishner reduction to the 3-ethyl tetralone. Then the ethylenedioxy protecting group is removed by treatment with acid.

Reaction of the thus-formed 3-methyl or 3-ethyl tetralone with vinyl magnesium bromide in an inert organic solvent such as tetrahydrofuran, diethyl ether or mixture thereof, by a procedure such as described in J. Org, Chem. 28, 1093 (1963), affords a corresponding 3-methyl- or 3-ethyl-1-vinyl-1-tetralol.

Isothiouronium acetate salt formation with the latter tetralol is then effected with isothiourea in acetic acid.

In addition, the intermediate tetralones necessary for the preparation of starting materials of formula I can be prepared from an appropriately substituted benzoic acid as shown in the following sequence wherein R'' and $R^3$ are as defined above.

In the practice of the above reaction sequence a benzoic acid of formula XXI is reacted with thionyl chloride in an inert solvent such as benzene and at the reflux temperature of the solvent for a period of about 2 hours to afford a corresponding acid chloride of formula XXII.

The acid chloride is then treated with di-lower alkyl-substituted cadmium (prepared from a corresponding lower alkyl Grignard reagent and an equivalent amount of cadmium chloride) to afford a ketone of formula XXIII.

Condensation of the thus-obtained ketone with glyoxylic acid under basic conditions affords the α,β-unsaturated-γ-keto acid of formula XXIV. Catalytic hydrogenation of this acid such as with a platinum oxide catalyst followed by Wolff-Kishner reduction of the keto group, affords an acid of formula XXV.

Ring cyclization of the latter acid with an acid such as polyphosphoric acid, stanic chloride and the like, in an inert solvent such as benzene, affords a tetalone (XXVI).

Reaction of the latter intermediate with a vinyl magnesium bromide as described hereinabove, affords an appropriately substituted 1-vinyl-1-tetralol. Isothiouronium acetate salt formation with the latter is effected as described hereinabove to obtain the starting material (I).

Instead of using the thus-obtained starting material (I), i.e., the isothiouronium acetate salt, in the process of Chart B above, there can be used an unsubstituted or correspondingly substituted 1-vinyl-1-tetralol as the starting material. Thus a 6-lower alkoxy-1-vinyl-1-tetralol is refluxed with a lower alkyl substituted tetronic acid in an aromic hydrocarbon solvent in the presence of a strong alkaline catalyst under an inert atmosphere for several hours, see U.S. Pat. No. 3,309,383. Use of an isothiouronium salt of formula I is preferable in that the reaction proceeds at room temperature, excellent yields are obtained, it is not necessary to use an inert atmosphere, recovery of the tricyclic compound is easier, and it is unnecessary to employ a catalyst.

The phenanthrene-2-carboxylic acids prepared by the processes of the present invention are valuable therapeutic agents having estrogenic activity. Com-

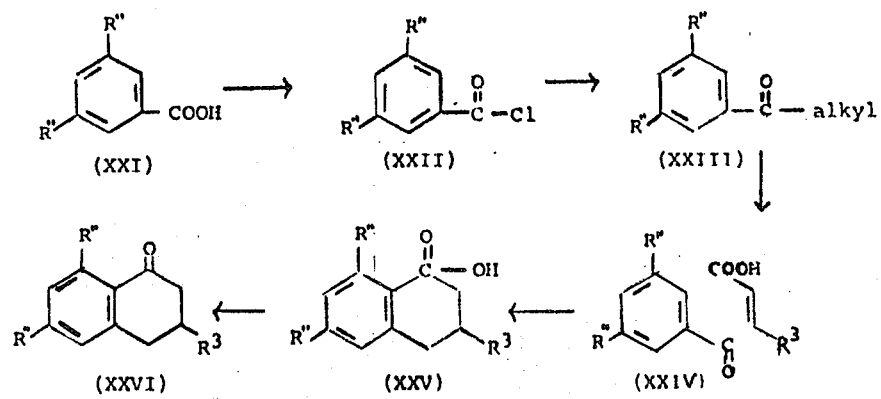

pounds of formula X above, for example, are useful in veterinary medicine for the treatment of underdeveloped females, in the poultry industry for caponization, for the fattening of cattle, and as anti-fertility agents. They can be administered in conjunction with one or more pharmaceutically acceptable excipients, orally or by injection, at a dosage level of from about 6 $\mu$g. to about 1 mg. per kilogram of body weight per day. Higher or lower dosages are also practical, the most favorable dosage range being determinable by one ordinary skill in the art giving due consideration to such factors as the age of the animal, the animal's response to initial treatment, the degree or severity of the condition being treated, and the like. Useful pharmaceutical acceptable excipients, solid or liquid, include water, polyalkylene glycols, vegetable oils, lactose, talc, magnesium stearate, gelatin, starches, flavoring agents, and the like.

The following examples are provided to illustrate the present invention.

EXAMPLE 1

A solution of 1 g. of 3,5-dimethoxybenzoic acid in 50 ml. of benzene is treated with 2 g. of thionyl chloride. The mixture is heated at reflux under anhydrous conditions for 2 hours and then evaporated under reduced pressure. The residue is dissolved in 20 ml. of benzene and this solution is evaporated to dryness to yield 3,5-dimethoxybenzoyl chloride.

A solution of 1 g. of the latter compound in 50 ml. of anhydrous ether is heated to reflux and a solution of 5 g. of diethyl cadmium and 50 ml. of anhydrous ether is added. After being heated to reflux for 20 hours the mixture is extracted with ether. These extracts are washed with water to neutrality and evaporated to yield 3,5-dimethoxy propiophenone.

A mixture of 1g. of the latter compound and 0.5 g. of glyoxylic acid in a solution of 0.5 g. of potassium hydroxide in 10 ml. of water and 10 ml. of ethanol is allowed to stand at room temperature for a period of 18 hours. The solid which forms is collected by filtration, washed with water and dried to yield 3-(3′,5′-dimethoxybenzoyl)-2-butenoic acid.

A suspension of 0.5 g. of 5% palladium-on-charcoal catalyst in 50 ml. of methanol is hydrogenated for 30 minutes. A solution of 1 g. of the latter compound and 200 ml. of methanol is added and hydrogenated with agitation until the uptake of hydrogen has ceased. The catalyst is removed by filtration and the solution is evaporated to yield 3-(3′,5′-dimethoxybenzoyl) butanoic acid.

A mixture of 1 g. of the latter compound, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200°C, and finally for an additional 2 hours at reflux. The mixture is cooled, water added and the product isolated by extraction with ether. These extracts are dried over sodium sulfate and evaporated to yield 3-(3′,5′-dimethoxybenzyl) butanoic acid.

A mixture of 1 g. of the latter material in 10 ml. of polyphosphoric acid is heated on a steam bath for a period of about 8 hours. The reaction mixture is then poured into icewater and the mixture is extracted several times with ether. The ether extracts are combined and evaporated to dryness to give 3-methyl-6,8-dimethoxy-1-tetralone.

By repeating the foregoing procedure with the exception of using 3-methoxy-5-methyl benzoic acid; 3-methoxy benzoic acid; m-toluic acid; and the like in place of 3,5-dimethoxy benzoic acid, the corresponding substituted tetralones are obtained, e.g., 3,8-dimethyl-6-methoxy-1-tetralone; 3-methyl-6-methoxy-1-tetralone; 3,8-dimethyl-1-tetralone; and the like, respectively.

By repeating the foregoing procedure using di-n-propyl cadmium in place of diethyl cadmium, the corresponding 3-ethyl tetralones are obtained, i.e., 3-ethyl-6,8-dimethoxy-1-tetralone; 3-ethyl-8-methyl-6-methoxy-1-tetralone; 3-ethyl-6-methoxy-1-tetralone; 3-ethyl-8-methyl-1-tetralone; and the like.

Likewise, by using an equivalent amount of dimethyl cadmium in place of diethyl cadmium in the foregoing procedure, the corresponding tetralones are obtained, i.e., 6,8-dimethoxy-1-tetralone; 8-methyl-6-methoxy-1-tetralone; 6-methoxy-1-tetralone; 8-methyl-1-tetralone; and the like.

A mixture of 1 g. of 3-methyl-6,8-dimethoxy-1-tetralone in 20 ml. of acetic acid is saturated with hydrogen bromide gas. The mixture is then allowed to stand for 24 hours and then the reaction mixture is concentrated. The thus-obtained residue, 25 ml. of 95% methanol and 0.5 g. of potassium hydroxide is refluxed for one hour. The reaction mixture is then poured into ice water and the solid which forms is collected by filtration, washed with water and dried to yield 3-methyl-6,8-dihydroxy-1-tetralone.

By repeating this procedure using the foregoing methyl ether tetralones in place of 3-methyl-6,8-dimethoxy-1-tetralone, the corresponding free hydroxy compounds are obtained, e.g., 3,8-dimethyl-6-hydroxy-1-tetralone; 3-methyl-6-hydroxy-1-tetralone; 3-ethyl-6,8-dihydroxy-1-tetralone; 3-ethyl-8-methyl-6-hydroxy-1-tetralone; 3-ethyl-6-hydroxy-1-tetralone; 6,8-dihydroxy-1-tetralone; 8-methyl-6-hydroxy-1-tetralone; 6-hydroxy-1-tetralone; and the like.

A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a solution of 1 g. of 3-methyl-6,8-dimethoxy-1-tetralone in 25 ml. of tetrahydrofuran and 10 ml. of ether and the resulting mixture is held at room temperature for a period of 24 hours, then heated at reflux for 1 hour and then cooled. The reaction mixture is then poured into water, acidified with hydrochloric acid and stirred vigorously to decompose any excess Grignard reagent. The organic phase is then separated and the aqueous layer is extracted several times with ether. The combined ether extracts are washed with water to neutrality. dried over sodium sulfate and evaporated to dryness to yield the crude 3-methyl-6,8-dimethoxy-1-vinyl-1-tetralol.

By repeating this procedure using the other tetralones in place of 3-methyl-6,8-dimethoxy-1-tetralone, the corresponding vinyl tetralols are obtained, e.g., 3,8-dimethyl-6-methoxy-1-vinyl-1-tetralol; 3-methyl-6-methoxy-1-vinyl-1-tetralol; 3,8-methyl- -dimethyl-1-vinyl-1-tetralol; 3-ethyl-6,8-dimethoxy-1-vinyl-1-tetralol; 3-ethyl-8-methyl-6-methoxy-1-vinyl-1-tetralol; 3-ethyl-6-methoxy-1-vinyl-1-tetralol; 3-ethyl-8-methyl-1-vinyl-1-tetralol; 3-methyl-6,8dihydroxy-1-vinyl-1-tetralol; 3,8-dimethyl-6-hydroxy-1-vinyl-1-tetralol; 3-methyl-6-hydroxy-1-vinyl-1-tetralol; 3-ethyl-6,8-dihydroxy-1-vinyl-1-tetralol; 3-ethyl-8-methyl-6-hydroxy-1-vinyl-1-tetralol; 3-ethyl-6-hydroxy-1-vinyl-1-tetralol; 6,8-dihydroxy-1-vinyl-1-tetralol; 8-methyl-6- hydroxy-1-vinyl-1-tetralol; 6,8-dimethoxy-1-vinyl-1-tetralol; 8γmethyl-6-methoxy-1-vinyl-1-tetralol; 8-methyl-1-vinyl-1-tetralol; and the like.

EXAMPLE 2

A mixture of 11.8 g. of thiourea and 100 ml. of acetic acid is warmed on a steam bath until the mixture becomes homogeneous. The solution is then cooled to room temperature and to it is then added 32 g. of 6-methoxy-1-vinyl-1-tetralol. The resulting mixture is agitated until the mixture again becomes homogeneous. The acetic acid is then removed by heating (50–60°C) under reduced pressure to afford a syrup. The syrup is poured with stirring into 70 ml. of ether. The resulting precipitate is collected and dried to yield 2-(6-methoxy-1,2,3,4-tetrahydronaphthyliden)ethyl isothiouronium acetate which can be recrystallized from methanol:ether.

In a similar manner, by repeating the above procedure with one exception, namely substituting 3-methyl-6-methoxy-1-vinyl-1-tetralol; 6,8-dihydroxy-1-vinyl-1-tetralol; 6-hydroxy-8-methyl-1-vinyl-1-tetralol; 3-methyl-6,8-dimethoxy-1-vinyl-1-tetralol; 3,8-dimethyl-6-methoxy-1-vinyl-1-tetralol; 3-ethyl-6,8-dimethoxy-1-vinyl-1-tetralol; 3-ethyl-8-methyl-6-methoxy-1-vinyl-1-tetralol; 3-ethyl-6-methoxy-1-vinyl-1-tetralol; 3,8-dimethyl-1-vinyl-1-tetralol; 8-methyl-6-methoxy-1-vinyl-1-tetralol; 8-methyl-1-vinyl-1-tetralol; 6,8-dimethoxy-1-vinyl-1-tetralol; and the like for 6-methoxy-1-vinyl-1-tetralol, there are obtained 2-(3-methyl-6-methoxy-1,2,3,4-tetrahydronaphthyliden) ethyl isothiouronium acetate;
2-(6,8-dihydroxy-1,2,3,4-tetrahydronaphthyliden)ethyl isothiouronium acetate;
2-(6-hydroxy-8-methyl-1,2,3,4-tetrahydronaphthyliden)ethyl isothiouronium acetate;
2(3-methyl-6,8-dimethoxy-1,2,3,4-tetrahydronaphthyliden) ethyl isothiouronium acetate;
2-(3,8-dimethyl-6-methoxy-1,2,3,4-tetrahydronaphthyliden) ethyl isothiouronium acetate;
2-(3-ethyl-6,8-dimethoxy-1,2,3,4-tetrahydronaphthyliden) ethyl isothiouronium acetate;
2-(3-ethyl-8-methyl-6-methoxy-1,2,3,4-tetrahydronaphthyliden)ethyl isothiouronium acetate;
2-(3-ethyl-6-methoxy-1,2,3,4-tetrahydronaphthyliden)ethyl isothiouronium acetate;
2-(3,8-dimethyl-1,2,3,4-tetrahydronaphthyliden)ethyl isothiouronium acetate;;
2-(8-methyl-6-methoxy-1,2,3,4-tetrahydronaphthyliden) ethyl isothiouronium acetate;
2-(8-methyl-1,2,3,4-tetrahydronaphthyliden)ethyl isothiouronium acetate;
2-(6,8-dimethoxy-1,2,3,4-tetrahydronaphthyliden)ethyl isothiouronium acetate; and the like, respectively.

EXAMPLE 3

To a well-stirred solution of 16.8 g. of ethyl α-propionyl propionate in 100 ml. of anhydrous ether is added dropwise 17 g. of bromine at such a rate that the solution continually remains clear. After completion of the bromine addition, stirring is maintained for an additional 2 hours. At the end of the reaction time, the ether is evaporated under reduced pressure and the resulting oil is then dissolved in 65 ml. of xylene, and the resulting xylene mixture is refluxed for 17 hours. The xylene mixture is allowed to cool and then concentrated to a smaller volume and upon cooling deposited a precipitate of α,γ-dimethyl tetronic acid which is collected by filtration and recrystallized from benzene:-hexane.

In a similar manner, by repeating the above procedure, the following starting materials, namely
ethyl α-propionyl butyrate;
ethyl α-propionyl-β-methyl butyrate;
ethyl α-butyroyl valerate; and
ethyl α-isovaleroyl propionate; are converted to
γ-ethyl-β-methyl tetronic acid;
γ-isopropyl-γ-methyl tetronic acid;
α-n-propyl-γ-ethyl tetronic acid; and
α-methyl-β-isopropyl tetronic acid; respectively.

EXAMPLE 4

To a solution of 12.5 g. of 2-(6-methoxy-1,2,3,4-tetrahydronaphthyliden)ethyl isothiouronium acetate in a mixture of 80 ml. of ethanol, and 100 ml. of water, is added a solution of 5.1 g. of α,γ-dimethyl tetronic acid in 20 ml. of ethanol. Immediately, the reaction mixture is diluted by adding an additional 80 ml. of water, stirred and allowed to stand at room temperature for a period of 16 hours. The reaction mixture is then cooled to 5°C for 2 hours, and the thus-formed precipitate collected by filtration to yield α-[2-(6-methoxy-1,2,3,4-tetrahydronaphthyliden)-ethyl]-α',γ-dimethyl tetronic acid.

By repeating the procedure of this example with the exception of substituting other isothiouronium acetates for 2-(6-methoxy-1,2,3,4-tetrahydronaphthyliden-)ethyl isothiouronium acetate, see for example Example 2 there is obtained, e.g., α-[2-(3-methyl-6-methoxy-1,2,3,4-tetrahydronaphthyliden)-ethyl]-α',γ-dimethyl tetronic acid; α-[2-(6,8-dihydroxy-1,2,3,4-tetrahydronaphthyliden)-ethyl]-α',γ-dimethyl tetronic acid; α-[2-(6-hydroxy-8-methyl-1,2,3,4-tetrahydronaphthliden)-ethyl]-α',γ-dimethyl tetronic acid; α-[2-(3-methyl-6,8-dimethoxy-1,2,3,4-tetrahydronapthyliden)-ethyl]-α',γ-dimethyl tetronic acid; α-[2-(3,8-dimethyl-6-methoxy-1,2,3,4-tetrahydronaphthyliden)-ethyl]-α',γ-dimethyl tetronic acid; α-[2-(3-ethyl-6,8-dimethoxy-1,2,3,4-tetrahydronaphyliden)-ethyl]-α',γ-dimethyl tetronic acid; α-[2-(3-ethyl-8-methyl-6-methoxy-1,2,3,4-tetrahydronaphthyliden)-ethyl]-α',γ-dimethyl tetronic acid; α-[2-(3-ethyl-6-methoxy-1,2,3,4-tetrahydronaphthyliden)-ethyl]-α',γ-dimethyl tetronic acid; α-[2-(3,8-dimethyl-1,2,3,4-tetrahydronaphthyliden)ethyl]-α',γ-dimethyl tetronic acid; α-[2-(8-methyl-6-methoxy-1,2,3,4-tetrahydronaphthyliden)ethyl-α' ,γ-dimethyl tetronic acid; α-[2-(8-methyl-1,2,3,5-tetrahydronaphthyliden) ethyl]-α',γ-dimethyl tetronic acid; α-[2-(6,8-dimethoxy-1,2,3,4-tetrahydronaphthyliden)ethyl]-α',γ-dimethyl tetronic acid and the like; respectively.

Similarly, by using other tetronic acids in the above procedure in place of α,γ-dimethyl tetronic acid, see for example Example 3 above, such as α-ethyl-γ-methyl tetronic acid, α-isopropyl-γ-methyl tetronic acid, α-(n-propyl)-γ-ethyl tetronic acid, α-methyl-γ-isopropyl tetronic acid, α-methyl tetronic acid, and the like, there are obtained α-[2-(6-methoxy-1,2,3,4-tetrahydronaphthyliden)-ethyl]-α'-ethyl-γ-methyl tetronic acid, α[2-(6-methoxy-1,2,3,4-tetrahydronaphthyliden)ethyl]α'-isopropyl-γ-methyl tetronic acid, α-[2-(6-methoxy-1,2,3,4-tetrahydronaphthyliden)-ethyl]-α'-(n-propyl)-γ-ethyl tetronic acid, α-[2-(6-methoxy-1,2,3,4-tetrahydronaphthyliden)-ethyl]-α'-methyl-γ-isopropyl tetronic acid, α-[2-(6-methoxy-1,2,3,4-tetrahydronaphthyliden)-ethyl]-α'-methyl tetronic acid, α-[2-(3-methyl-6-methoxy-1,2,3,4-tetrahydronaphthyliden)-ethyl]-α'-ethyl-γ-methyl tetronic acid, α-[2-(3-methyl-6-methoxy-1,2,3,4-tetrahydronaphthyliden)ethyl]-α'-isopropyl-γ-methyl tetronic acid, α-[2-(3-methyl-6-methoxy-1,2,3,4-tetrahydronaphthyliden)-ethyl]-α'-(n-propyl)-γ-ethyl tetronic acid, α-[2-(3-methyl-6-methoxy-1,2,3,4-tetrahydronaphthyliden)-ethyl]-α'-methyl-γ-isopropyl tetronic acid, α-[2-(3-methyl-6-methoxy-1,2,3,4-tetrahydronaphthyliden)-ethyl]-α'-methyl tetronic acid, α-[2-(6,8-dihydroxy-1,2,3,4-tetrahydronaphthyliden)-ethyl]-α'-ethyl-γ-methyl tetronic acid, α-[2-(6,8-dihydroxy-1,2,3,4-tetrahydronaphthyliden)-ethyl]-α'-isopropyl-γ-methyl tetronic acid, α-[2-(6,8-dihydroxy-1,2,3,4-tetrahydronaphthyliden)-ethyl]-α'-(n-propyl)-γ-ethyl tetronic acid, α-]2-96,8-dihydroxy-1,2,3,4-tetrahydronaphthliden)-ethyl]-α'-methyl-γ-isopropyl tetronic acid, α-[2-(6,8-dihydroxy-1,2,3,4-tetrahydronaphthyliden)-ethyl]-α'-methyl tetronic acid; and the like; respectively.

EXAMPLE 5

Nine grams of α-[2-(6-methoxy-1,2,3,4-tetrahydronaphthyliden)-ethyl]-α',γ-dimethhyl tetronic acid and 460 mg. of p-toluenesulfonic acid in 120 ml. of benzene is heated at reflux for four hours, during which time water is continuously removed from the reaction mixture by a Dean-Stark trap. After cooling, the reaction mixture is filtered through a short column of silica gel and evaporated under reduced pressure to yield 3-methoxy-15-methyl-16-oxaestra-1,3,5(10),8,14-pentaen-17-one which is crystallized from ether.

By repeating the above procedure with the exception of using other tricyclic compounds, see Example 4 above, as the starting material, there is obtained 3-methoxy-7,15-dimethyl-16-oxaestra-1,3,5(10),8,14-pentaen-17-one; 1,3-dihydroxy-15-methyl-16-oxaestra-1,3,5(10),8-14-pentaen-17-one; 3-hydroxy-1,15-dimethyl-16-oxaestra-1,3,5(10),8,14-pentaen-17-one; 1,3-dimethoxy-7,15-dimethyl-16-oxaestra-1,3,5(10),8,14-pentaen-17-one; 3-methoxy-1,7,15-trimethyl-16-oxaestra-1,3,5(10),8,14-pentaen-17-one; 1,3-dimethoxy-7-ethyl-15-methyl-16-oxaestra-1,3,5(10),8,14-pentaen-17-one; 3-methoxy-1,15-dimethyl-7-ethyl-16-oxaestra-1,3,5(10), 8,14-pentaen-17-one; 3-methoxy-7-ethyl-15-methyl-16-oxaestra-1,3,5(10),8,14-pentaen-17-one; 3-desoxy-1,7,15-trimethyl-16-oxaestra-1,3,5(10),8,14-pentaen-17-one; 3-methoxy-1,15-dimethyl-16-oxaestra-1,3,5(10), 8,14-pentaen-17-one; 3-desoxy-1,15-dimethyl-16-oxaestra-1,3,5(10)-8,14-pentaen-17-one; 1,3-dimethoxy-15-methyl-16-oxaestra-1,3,5(10),8,14-pentaen-17-one; 3-methoxy-13-ethyl-15-methyl-16-oxagona-1,3,5(10),8,14-pentaen-17-one; 3-methoxy-13-isopropyl-15-methyl-16-oxagona-1,3,5(10),8,14-pentaen-17-one; 3-methoxy-13-n-propyl-15-ethyl-16-oxagona-1,3,5(10),8,14-pentaen-17-one; 3-methoxy-15-isopropyl-16-oxaestra-1,3,5(10),8,14-pentaen-17-one; 3-methoxy-16-oxaestra-1,3,5(10),8,14-pentaen-17-one; 3-methoxy-13-ethyl-7,15-dimethyl-16-oxagona-1,3,5(10),8,14-pentaen-17-one; 3-methoxy-7,15-dimethyl-13-isopropyl-16-oxagona-1,3,5(10) 8,14-pentaen-17-one; 3-methoxy-7-methyl-13-n-propyl-15-ethyl-16-oxagona-1,3,5(10),8,14-pentaen-17-one; 3-methoxy-7-methyl- 15-isopropyl-16-oxaestra-1,3,5(10),+8,14-pentaen-17-one; 3-methoxy-7-methyl-16-oxaestra-1,3,5(10),8,14-pentaen-17-one; 1,3-dihydroxy-13-ethyl-16-methyl-16-oxagona-1,3,5(10),8,14-pentaen-17-one; 1,3-dihydroxy-15-methyl-13-isopropyl-16-oxagona-1,3,5(10),8,14-pentaen-17-one; 1,3-dihydroxy-15-isopropyl-16-oxacestra-1,3,5(10), 8,14-pentaen-17-one; 1,3-dihydroxy-16-oxaestra-1,3,5(10),8,14-pentaen-17-one; and the like, respectively.

In the process of this example, the 7-alkyl(methyl or ethyl) substituted 16-oxasteroids are obtained as a mixture of the 7α- and 7β- isomers. These isomers can be separated by chromatography. Succeeding examples in which the 7-alkyl substituted 16-oxa steroids are employed are applicable to either of the isomers individually or a mixture thereof in which case the isomers can be separated by chromatography or crystallization at a later time. In order to avoid undue prolixity, the designation 7-methyl or 7-ethyl(10-methyl or 10-ethyl in the case of phenanthrene derivatives) herein is understood to include the individual isomers as well as a mixture of the isomers unless otherwise specified.

EXAMPLE 6

A mixture of 0.5 g. of 3-methoxy-15-methyl-16-oxaestra-1,3,5(10),8,14-pentaen-17-one and 5 mg. of 5% palladium-on-charcoal catalyst and 75 ml. of xylene is heated at reflux for 36 hours. The mixture is then cooled, filtered to remove the catalyst and the filtrate is evaporated under reduced pressure to yield a residue containing predominantly 3-methoxy-15-methyl-16-oxaestra-1,3,5(10),6,8,14-hexaen-17-one and a small amount of 3-methoxy-15ξ-methyl-16-oxa-14β-estra-1,3,5(10),6,8-pentaen-17-one. The residue is purified by preparative thin layer chromatography and crystallized from methanol to yield 3-methoxy-15-methyl-16-oxa-estra-1,3,5(10),6,8,14-hexaen-17-one.

By repeating the procedure of this example using other 16-oxa compounds, for example those of Example 5, as the starting material in place of 3-methoxy-15-methyl-16-oxaestra-1,3,5(10), 8,14-pentaen-17-one, the corresponding 9,10-dehydro derivatives are obtained, for example, 3-methoxy-7,15-dimethyl-16-oxaestra-1,3,5(10),6,8,14-hexaen-17-one; 1,3-dihydroxy-15-methyl-16-oxaestra-1,3,5(10),6,8,14-hexaen-17-one; 3-hydroxy-1,15-dimethyl 16-oxaestra-1,3,5(10),6,8,14-hexaen-17-one; 1,3-dimethoxy-7,15-dimethyl-16-oxaestra-1,3,5(10),6,8,14-hexaen-17-one; 3-methoxy-1,7,15-trimethyl-16-oxaestra-1,3,5(10),6,8,14-hexane-17-one; 1,3-dimethoxy-7-ethyl-15-methyl-16-oxaestra-1,3,5(10),6,8,14-hexaen-17-one; 3-methoxy-1,15-dimethyl-7-ethyl-16-oxaestra-1,3,5(10),6,8,14-hexaen-17-one; 3-methoxy-7-ethyl-15-methyl-16-oxaestra-1,3,5(10), 6,8,14-hexaen-17-one; 3-desoxy-1,7,15-trimethyl-16-oxaestra-1,3,5(10),6,8,14-hexaen-17-one; 3-methoxy-1,15-dimethyl-16-oxaestra-1,3,5(10),6,8,14-hexaen-17-one; 3-desoxy-1,15-dimethyl-16-oxaestra-1,3,5(10),6,8,14-hexaen-17-one; 1,3-dimethoxy-15-methyl-166,8,14-hexaen-17-one; 3-methoxy-13-ethyl-15-methyl-16-oxagona-1,3,5(10),6,8,14-hexaen-17-one; 3-methoxy-13-isopropyl-15-methyl-16-oxagone-1,3,5(10), 6,8,14- hexaen-17-one; 3-methoxy-13-n-propyl-15-ethyl-16-oxagona-1,3,5(10),6,8,14-hexaen-17-one; 3-methoxy-15-isopropyl-16-oxaestra-1,3,5(10),6,8,14-hexaen-17-one; 3-methoxy-16-oxaestra-1,3,5(10),6,8,14-hexaen-17-one; and the like; respectively.

EXAMPLE 7

A mixture of 0.5 g. of 3-methoxy-15-methyl-16-oxaestra- 1,3,5(10),8,14-pentaen-17-one, 0.4 g. of maleic acid and 0.25 g. of 5% palladium-on-charcoal catalyst and 75 ml. of benzene is heated at reflux for about 24 hours. The mixture is then cooled to room temperature and filtered. The filtrate is then washed with a dilute aqueous sodium bicarbonate solution, dried and evaporated to yield 3-methoxy-15-methyl-16-oxaestra-1,3,5(10),6,8,14-hexaen-17-one which is crystallized from methanol.

In a similar manner, by repeating the above procedure with the 16-oxa compounds of Example 5 as the starting material in place of 3-methoxy-15-methyl-16-oxaestra-1,3,5(10),8,14-pentaen-17-one, the corresponding 9,10-dehydro compounds are obtained.

Alternatively, dehydrogenation of the 16-oxa steroids at C-9,10 can be carried out using selenium dioxide in t-butanol in the presence of pyridine at reflux for about 48 hours or using 2,3-dichloro-5,6-dicyano-1,4benzoquinone in dioxane at reflux for about 12 hours.

EXAMPLE 8

A mixture of 250 mg. of 3-methoxy-15-methyl-16-oxaestra-1,3,5(10), 6,8,14-hexaen-17-one in 25 ml. of absolute ethanol and 10 ml. of 1N aqueous hydroxide solution is allowed to stand at room temperature for 24 hours. The reaction mixture is then filtered and the thus-collected crystalline residue is washed with water and dried to yield the sodium salt of cis 7-methoxy-1-acetyl-2-methyl-1,2,3,4-tetrahydrophenanthrene-2-carboxylic acid.

EXAMPLE 9

A mixture of 307 mg. of the sodium salt of cis 7-methoxy-1-acetyl-2-methyl-1,2,3,4-tetrahydrophenanthrene-2-carboxylic acid, 1 ml. of methyl iodide and 7 ml. of dimethylacetamide is stirred in the dark for 5 hours. Then, excess methyl iodide is removed by evaporation under reduced pressure. The reaction mixture is then poured into water and the mixture extracted several times with ether. The ether extracts are combined, washed with water and then dilute aqueous sodium thiosulfate solution, dried and evaporated to furnish the methyl ester of cis 7-methoxy-1-acetyl-2-methyl-1,2,3,4-tetrahydrophenanthrene-2-carboxylic acid which can be crystallized from benzene-hexane.

Similarly, by repeating the above procedure using other lower alkyl iodides or bromides, e.g., ethyl iodide and the like, in place of methyl iodide, the corresponding lower alkyl esters are obtained, e.g., ethyl ester of cis 7-methoxy-1-acetyl-2-methyl-1,2,3,4-tetrahydrophenanthrene-2-carboxylic acid and the like.

EXAMPLE 10

Into the cathode compartment of a divided electrolysis cell provided with a cellulose dialysis membrane, lead electrodes (each electrode measuring 2 × 5 × 1.6 mm.) and a stirrer there is added 20 mg. of the methyl ester of cis 7 -methoxy-1-acetyl-2-methyl-1,2,3,4-tetrahydropphenanthrene-2-carboxylic acid and a mixture of 15 ml. of dioxane and 15 ml. of 10% aqueous sulfuric acid (by weight). An additional amount of a mixture of 15 ml. of dioxane and 15 ml. of 10% aqueous sulfuric acid is added to the cell. A current density of 0.02 amps./cm.$^2$ is applied for a period of five hours. The reaction mixture is then removed from the cell and concentrated under reduced pressure to a small volume which is then extracted several times with ether. The ether extracts are combined, washed with water and a 5% aqueous sodium bicarbonate solution, dried and evaporated to dryness to furnish the methyl ester of cis 7-methoxy-1-ethyl-2-methyl-1,2,3,4-tetrahydrophenanthrene-2-carboxylic acid.

EXAMPLE 11

A mixture of 330 mg. of the methyl ester of cis 7-methoxy 1-ethyl-2-methyl-1,2,3,4-tetrahydrophenanthrene-2-carboxylic acid, 3.5 g. of potassium hydroxide, 7 ml. of ethanol and 7 ml. of water in a sealed tube is heated at about 180°C for 45 minutes. The reaction mixture is allowed to cool and is then poured into water. The resulting mixture is then acidified by the addition of dilute aqueous hydrochloric acid and extracted several times with the ethyl acetate. The ethyl acetate extracts are combined, dried and evaporated to furnish cis 7-methoxy-1-ethyl-2-methyl-1,2,3,4-tetrahydrophenanthrene-2-carboxylic acid.

EXAMPLE 12

A mixture of 250 mg. of 3-methoxy-15-methyl-16-oxaestra-1,3,5(10),8,14-pentaen-17-one in 30 ml. of ethanol and 10 ml. of 1N aqueous sodium hydroxide solution is allowed to stand at room temperature for 2 hours. This mixture which contains the sodium salt of cis 7-methoxy-1-acetyl-2-methyl-1,2,3,4,9,10-hexahydrophenanthrene-2-carboxylic acid is then acidified by the addition of 0.1N aqueous hydrochloric acid. The resulting acidic mixture is then extracted several times with ether. The ether extracts are combined, dried and evaporated under reduced pressure to a residue which is crystallized from ethyl acetate to give cis 3-methoxy-15ξ-methyl-15ξ-hydroxy-16-oxa-14β-estra-1,3,5(10),8-tetraen-17-one.

EXAMPLE 13

200 Mg. of the sodium salt of cis 7-methoxy-1-acetyl-2-methyl-1,2,3,4-tetrahydrophenanthrene-2-carboxylic acid in 15 ml. of ethanol is added to 50 ml. of 0.1N aqueous hydrochloric acid and is allowed to stand at room temperature. The resulting mixture is then extracted several times with ether. The ether extracts are combined, dried and concentrated in vacuo. The residue is then crystallized from ethyl acetate to give cis 3-methoxy-15ξ-methyl-15ξ-hydroxy-16-oxa-14β-estra-1,3,5(10), 6,8-pentaen-17-one, m.p. 146°–148°C, $\gamma_{max.}^{CHCl_3}$ 1,770 cm.$^{-1}$

EXAMPLE 14

The procedure of Example 12 is repeated with the exception of using other 16-oxa steroids, see for example Examples 5 and 6, as the starting material in place of 3-methoxy-15-methyl-16-oxaestra-1,3,5(10),8,14-pentaen-17-one such as 3-methoxy-7,15-dimethyl-16-oxaestra-1,3,5(10), 8,14-pentaen-17-one; 1,3- dihydroxy-15-methyl-16-oxaestra-1,3,5-(10),8,--pentaen-17-one; 3-hydroxy-1,15-dimethyl-16-oxaestra-1,3,5(10),8,14-pentaen-17-one; 1,3-dimethoxy-7,15-dimethyl-16-oxaestra-1,3,5(10),8,14-pentaen-17-one; 3-methoxy-1,7,15-trimethyl-16-oxaestra-1,3,5(10),8,14-pentaen-17-one; 1,3-dimethoxy-7-ethyl-15-methyl-16-oxaestra-1,3,5(10),8,14-pentaen-17one; 3-methoxy-1,15-dimethyl-7-ethyl-16-oxaestra-1,3,5(10),8,14-pentaen-17-one 3-methoxy-7-ethyl-15-methyl-16-oxaestra-1,3,5(10),8,14-pentaen-17one; 3-desoxy-1,7,15-trimethyl-16-oxaestra-1,3,5(10),8,14-pentaen-17-one; 3-methoxy-15-dimethyl-16-oxaestra-1,3,5(10),8,14-pentaen-17-one; 3-desoxy-1,15-dimethyl-16-oxaestra-1,3,5(10),8,14-pentaen-17-one; 1,3-dimethoxy-15-methyl-16-oxaestra-1,3,5(10),8,14-pentaen-17-one; 3-methoxy-13-ethyl-7,15-dimethyl-16-oxagona-1,3,5(10),8,14-pentaen-17-one; 3-methoxy-13-isopropyl-7,15-dimethyl-16-oxagona-1,3,5(10),8,14-pentaen-17-one; 3-methoxy-7-methyl-13-n-propyl-15-ethyl-16-oxagona-1,3,5(10),8,14-pentaen-17-one; 3-methoxy-7-methyl-15-isopropyl-16-oxaestra-1,3,5(10),8,14-pentaen-17-one; 3-methoxy-7-methyl-16-oxaestra-1,3,5(10),8,14-pentaen-17-one; and the like; and the corresponding 6,7-dehydro compounds; and there is obtained first the sodium salt; namely the sodium salt of : cis 7-methoxy-2,10-dimethyl-1-acetyl-1,2,3,4,9,10-hexahydrophenanthrene-2-carboxylic acid; cis 5,7-dihydroxy-1-acetyl-2-methyl-1,2,3,4,9,10-hexahydrophenanthrene-2-carboxylic acid; cis 7-hydroxy-1-acetyl-2,5-dimethyl-1,2,3,4,9,10-hexahydrophenanthrene-2-carboxylic acid; cis 5,7-dimethoxy-1-acetyl-2,10-dimethyl-1,2,3,4,9,10-hexahydrophenanthrene-2-carboxylic acid; cis 7-methoxy-1-acetyl-2,5,10-trimethyl-1,2,3,4,9,10-hexahydrophenanthrene-2-carboxylic acid; cis 5,7-dimethoxy-1-acetyl-2-methyl-10-ethyl-1,2,3,4,9,10-hexahydrophenanthrene-2-carboxylic acid; cis 7-methoxy-1-acetyl-2,5-dimethyl-10-ethyl-1,2,3,4,9,10-hexahydrophenanthrene-2-carboxylic acid; cis 7-methoxy-1-acetyl-2-methyl-10-ethyl-1,2,3,4,9,10-hexahydrophenanthrene-2-carboxylic acid; cis 2,5,10-trimethyl-1-acetyl-1,2,3,4,9,10-hexahydrophenanthrene-2-carboxylic acid; cis 7-methoxy-2,5-dimethyl-1-acetyl-1,2,3,4,9,10-hexahydrophenanthrene-2-carboxylic acid; cis 2,5-dimethyl-1-acetyl-1,2,3,4,9,10-hexahydrophenanthrene-2-carboxylic acid; cis 5,7-dimethoxy-2-methyl-1-acetyl-1,2,3,4-hexahydrophenanthrene-2-carboxylic acid; cis 7-methoxy-1-acetyl-2-ethyl-10-methyl-1,2,3,4,9,10-hexahydrophenanthrene-2-carboxylic acid; cis 7-methoxy-1-acetyl-2-isopropyl-10-methyl-1,2,3,4,9,10-hexahydrophenanthrene-2-carboxylic acid; cis 7-methoxy-1-propionyl-2-propyl-10-methyl-1,2,3,4,9,10-hexahydrophenanthrene-2-carboxylic acid; cis 7-methoxy-1-s-butyryl-2,10-dimethyl-1,2,3,4,9,10-hexahydrophenanthrene-2-carboxylic acid; cis 7-methoxy-2,10-dimethyl-1-formyl-1,2,3,4,9,10-hexahydrophenanthrene-2-carboxylic acid; and the like, and the corresponding 9,10-dehydro or -unsaturated compounds (i.e., the corresponding 1,2,3,4-tetrahydro compounds); respectively, which can be isolated at this point by concentration of the reaction mixture, if desired, or acidified as in Example 12 to afford cis 3-methoxy-),15$\xi$-dimethyl-15$\xi$-hydroxy-16-oxa-14$\beta$-estra-1,3,5(10),8-tetraen-17-one; cis 1,3-dihydroxy-15$\xi$-methyl-15$\xi$-hydroxy-16-oxa-14$\beta$-estra-1,3,5(10),8-tetraen-17-one cis 3-hydroxy-1,15$\xi$-dimethyl-15-hydroxy-16-oxa-14$\beta$-estra-1,3,5-(10),8-tetraen-17-one; cis 1,3-dimethoxy-7,15$\xi$-dimethyl-15$\xi$-hydroxy-16-oxa-14$\beta$-estra-1,3,5-10),8-tetraen-17-one; cis 3-methoxy-1,7,15$\xi$-trimethyl-15$\xi$-hydroxy-16-oxa-14$\beta$-estra-1,3,5(10),8-tetraen-17-one; cis 1,3-dimethoxy-7-ethyl-15$\xi$,-methyl-15$\xi$-hydroxy-16-oxa-14$\beta$-estra-1,3,5(10),8-tetraen-17-one; cis 3-methoxy-1,15$\xi$-dimethyl-15$\xi$-hydroxy-7-ethyl-16-oxa-14$\beta$-estra-1,3,5(10),8-tetraen-17-one; cis 3-methoxy-7-ethyl-15$\xi$-methyl-15$\xi$-hydroxy-16-oxa-14$\beta$-estra-1,3,5(10),8-tetraen-17-one; cis 1,7,15$\xi$-trimethyl-15$\xi$-hydroxy-16-oxa-14$\beta$-estra-1,3,5(10),8-tetraen-17-one; cis 3-methoxy-1,15$\xi$-dimethyl-15$\xi$-hydroxy-16-oxa-14$\beta$-estra-1,3,5(10),8-tetraen-17-one; cis 1,15$\xi$-dimethyl-15$\xi$-hydroxy-16-oxa-14$\beta$-estra-1,3,5(10),8-tetraen-17-one; cis 1,3-dimethoxy-15$\xi$-methyl-15$\xi$-hydroxy-16-oxa-14$\beta$-estra-1,3,5(10),8-tetraen-17-one; cis 3-methoxy-13-ethyl-7,15$\xi$-dimethyl-15$\xi$-hydroxy-16-oxa-14$\beta$-gona-1,3,5(10),8tetraen-17-one; cis 3-methoxy-13-isopropyl-7,15$\xi$-dimethyl-15$\xi$-hydroxy-16-oxa-14$\beta$-gona-1,3,5(10),8-tetraen-17-one; cis 3-methoxy-13-n-propyl-15$\xi$-ethyl-15$\xi$-hydroxy-7-methyl-16-oxa-14$\beta$-gona-1,3,5(10),8-tetraen-17-one; cis 3-methoxy-15$\xi$-isopropyl-15$\xi$-hydroxy-7-methyl-16-oxa-14$\beta$-estra-1,3,5(10),8-tetraen-17-one; cis 3-methoxy-7-methyl-15$\xi$-hydroxy-16-oxa-14$\beta$-estra-1,3,5(10 ),8-tetraen-17-one; and the like, and the corresponding 6,7-dehydro compounds (i.e., the corresponding 1,3,5-(10),6,8-pentaen compounds); respectively.

EXAMPLE 15

The process of Example 10 is repeated with the exception that 20% aqueous sulfuric acid is used in place of the 10% aqueous sulfuric acid and the cis keto ester (i.e., the methyl ester of cis 7-methoxy-1-acetyl-2-methyl-1,2,3,4-tetrahydrophenanthrene-2-carboxylic acid) starting material is replaced with the cis lactols obtained in Examples 12 and 14 as the starting material and there is obtained cis 7-methoxy-1-ethyl-2-methyl-1,2,3,4,9,10-hexahydrophenanthrene-2-carboxylic acid; cis 7-methoxy-2,10-dimethyl-1-ethyl-1,2,3,4,9,10-hexahydrophenanthrene-2-carboxylic acid; cis 5,7-dihydroxy-1-ethyl-2-methyl-1,2,3,4,9,10-hexahydrophenanthrene-2-carboxylic acid; cis 7-hydroxy-1-ethyl-2,5-dimethyl-1,2,3,4,9,10-hexahydrophenanthrene-2-carboxylic acid; cis 5,7-dimethoxy-1-ethyl-2,10-dimethyl-1,2,3,4,9,10-hexahydrophenanthrene-2-carboxylic acid; cis 7-methoxy-1-ethyl-2,5,10-trimethyl-1,2,3,4,9,10-hexahydrophenanthrene-2-carboxylic acid; cis 5,7-dimethoxy-1,10-diethyl-2-methyl-1,2,3,4,9,10-hexahydrophenanthrene-2-carboxylic acid; cis 7-methoxy-1,10-diethyl-2,5-dimethyl-1,2,3,4,9,10-hexahydrophenanthrene-2-carboxylic acid; cis 7-methoxy-1,10-diethyl-2-methyl-1,2,3,4,9,10-hexahydrophenanthrene-2-carbboxylic acid; cis 2,5,10-trimethyl-1-ethyl-1,2,3,4,9,10-hexahydrophenanthrene-2-carboxylic acid; cis 7-methoxy-2,5-dimethyl-1-ethyl-1,2,3,4,9,10-hexahydrophenanthrene-2-carboxylic acid; cis 2,5-dimethyl-1-ethyl-1,2,3,4,9,10-hexahydrophenanthrene-2-carboxylic acid; cis 5,7-dimethoxy-2-methyl-1-ethyl-1,2,3,4,9,10-hexahydrophenanthrene-2-carboxylic acid; cis 7- methoxy-1,2-diethyl-10-methyl-1,2,3,4,9,10-hexahydrophenanthrene-2-carboxylic acid; cis 7-methoxy-1-ethyl-2-isopropyl-10-methyl-1,2,3,4,9,10-hexahydrophenanthrene-2-carboxylic acid; cis 7-methoxy-1,2-di(n-propyl)-10-methyl-1,2,3,4,9,10-hexahydrophenanthrene-2-carboxylic acid; cis 7-methoxy-1-s-butyl-2,10-dimethyl-1,2,3,4,9,10-hexahydrophenanthrene-2-carboxylic acid; cis 7-methoxy-1,2,10-trimethyl-1,2,3,4,9,10-hexahydrophenanthrene-2-carboxylic acid and the like; and the corresponding 9,10-dehydro compounds; respectively.

EXAMPLE 16

A mixture of 150 mg. of 3-methoxy-15-methyl-16-oxaestra-1,3,5(10),8,14-pentaen-17-one and 50 mg. of 10% palladium-on-charcoal catalyst is heated at 180°C for 3 hours under a nitrogen atmosphere. The reaction mixture is allowed to cool to about room temperature and then 200 ml. of chloroform is added. The resulting chloroform mixture is filtered to remove the catalyst and the filtrate is evaporated to give 3-methoxy-15ξ-methyl-16-oxa-14β-estra-1,3,5(10),6,8-pentaen-17-one which is crystallized from ether-hexane, m.p. 183°–185°C, $\gamma_{max.}^{KBr}$ 1,770 cm.$^{-1}$ represented by the formula:

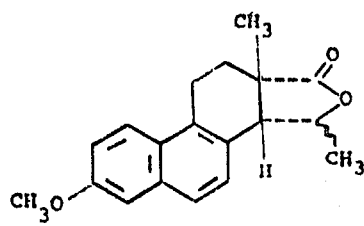

By using other 16-oxa steroids, for example, those of Example 5 above, as the starting material in the above process in place of 3-methoxy-15-methyl-16-oxaestra-1,3,5(10),8,14-pentaen-17-one, the corresponding cis saturated lactone is obtained, for example, 3-methoxy-7,15ξ-dimethyl-16-oxa-14β-ostra-1,3,5(10),6,8-pentaen-17-one; 1,3-dihydroxy-15ξ-methyl-16-oxa-14β-estra-1,3,5(10),6,8-pentaen-17-one; 3-hydroxy-1,15-dimethyl-16-oxa-14β-estra-1,3,5(10),6,8-pentean-17-one, 1,3-dimethoxy-7,15ξ-dimethyl-16-oxa-14β-estra-1,3,5(10),6,8-pentaen-17-one; 3-methoxy-1,7,15ξ-trimethyl-16-oxa-14β-estra-1,3,5(10),6,8-pentaen-17-one; 1,3-dimethoxy-7-ethyl-15ξ-methyl-16-oxa-14β-estra-1,3,5(10),6,8-pentaen-17-one; 3-hydroxy-1,15ξ-dimethyl-7-ethyl-16-oxa-14β-estra-1,3,5(10)6,8-pentaen-17-one; 3-methoxy-7-ethyl-15ξ-methyl-16-oxa-14β-estra-1,3,5(10)-6,8-pentaen-17-one; 3-methoxy-13-ethyl-15ξ -methyl-16-oxa-14β-gona-1,3,5(10)6,8-pentaen-17-one; 3-methoxy-13-isopropyl-15ξ-methyl-16-oxa-14β-gona-1,3,5(10),6,8-pentaen-17-one; 3-methoxy-13-n-propyl-15ξ-ethyl-16-oxa-14β-gona-1,3,5(10)-6,8-pentaen-17-one; 3-methoxy-15ξ-isopropyl-6-oxa-14β-estra-1,3,5(10),6,8-pentaen-17-one, and the like.

EXAMPLE 17

A mixture of 1 g. of cis 3-methoxy-15ξ-methyl-16-oxa-14β-estra-1,3,5(10)6,8-pentaen-17-one and 50 ml. of 5% ethanolic sodium hydroxide soluion is heated at 180°C for is hours in a sealed tube. The reaction mixture i allowed to cool, saturated with carbon dioxide, filtered, and the filtrate concentrated to give the sodium salt of cis 7-methoxy-1-(1'-hydroxyethyl)-2-methyl-1,2,3,4-tetrahydrophenanthrene-2-carboxylic acid which is represented by the following formula.

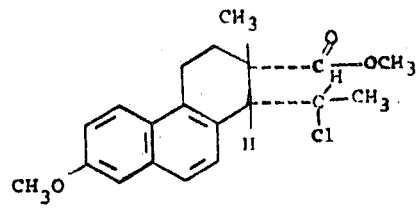

The above-prepared sodium salt is added to 50 ml. of dioxane and 5 ml. of methyl iodide and the resulting mixture is heated at about 90°C for 2 hours. Excess methyl iodide is then removed by evaporation under reduced pressure and the reaction mixture is extracted several times with ethyl acetate. The ethyl acetate extracts are combined and evaporated to give the methyl ester of cis 7-methoxy-1-(1'-hydroxyethyl)-2-methyl-1,2,3,4-tetrahydrophenanthrene-2-carboxylic acid.

A mixture of the above prepared methyl ester, 5 ml. of thionyl chloride and 50 ml. of benzene is allowed to stand at room temperature for 8 hours. The reaction mixture is then evaporated under reduced pressure to yield a chloro intermediate of the following formula:

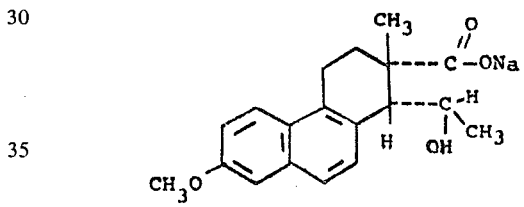

The above prepared chloro intermediate is dissolved in ethanol containing 1 ml. of amonium hydroxide and 100 mg. of 5% palladium-on-charcoal catalyst and the resulting mixture is allowed to stand at room temperature for 2 hours. The mixture is then filtered and the filtrate is evaporated under reduced pressure to give the methyl ester of cis 7-methoxy-1-ethyl-2-methyl-1,2,3,4-tetrahydrophenanthrene-2-carboxylic acid. Then, by using the procedure of Example 11, the thus-prepared methyl ester is hydrolyzed to the free acid, namely, cis 7-methoxy-1-ethyl-2-methyl-1,2,3,4-tetrahydrophenanthrene-2-carboxylic acid or, in other words, cis bisdehydrodoisynolic acid.

By repeating the procedures of this example using as the cis lactone starting material, the cis lactones obtained in Example 16, the corresponding sodium salt, methyl ester, chloro intermediate, methyl ester and free acid; respectively, are obtained, for example the sodium salt of cis 7-methoxy-1-(1'-hydroxyethyl)-2,10-dimethyl-1,2,3,4-tetrahydrophenanthrene-2-carboxylic acid, the methyl ester of cis 7-methoxy-1-(1'-hydroxyethyl)-2,10-dimethyl-1,2,3,4-tetrahydrophenanthrene-2-carboxylic acid, the methyl ester of cis 7-methoxy-1-(1'-chloroethyl)-2,10-dimethyl-1,2,3,4-tetrahydrophenanthrene-2-carboxylic acid, the methyl ester of cis 7-methoxy-1-ethyl-2,10-dimethyl-1,2,3,4-tetrahydrophenanthrene-2-carboxylic acid, and cis 7-methoxy-1-ethyl-2,10-dimethyl-1,2,3,4-tetrahydrophenanthrene-2-carboxylic acid; and the like.

EXAMPLE 18

50 Mg. of 3-methoxy-15-methyl-16-oxaestra-1,3,5(10),6,8,14-hexaen-17-one in 5 ml. of ethyl acetate is hydrogenated with 30 mg. of prehydrogenated platinum oxide catalyst for 18 hours at room temperature. The reaction mixture is then filtered and the filtrate is evaporated to give a mixture of cis 7-methoxy-1-ethyl-2-methyl-1,2,3,4-tetrahydrophenanthrene-2-carboxylic acid and cis 3-methoxy-15ξ-methyl-16-oxa-14β-estra-1,3,5(10),6,8-pentaen-17-one which is separated by preparative chromatography on silica gel using ethyl acetate:hexane (2:8). The cis 7-methoxy-1-ethyl-2-methyl-1,2,3,4-tetrahydrophenanthrene-2-carboxylic acid can be further purified by recrystallization from methanool, if desired.

In a similar manner, using the above procedure, other 16-oxa steroids (see Example 6, for example) can be converted into the corresponding cis acid and cis saturated lactone.

EXAMPLE 19

A mixture of 250 mg. of 3-methoxy-15-methyl-16-oxestra-1,3,5(10),8,14-pentaen-17-one in 30 ml. of ethanol and 10 ml. of 1N aqueous sodium hydroxide solution is allowed to stand at room temperature for two hours. The reaction mixture is then extracted with ether several times. The ether extracts are combined, dried and evaporated to give the sodium salt of cis 7-methoxy-1-acetyl-2-methyl-1,2,3,4,9,10-hexahydrophenanthrene-2-carboxylic acid.

Similarly, using other 16-oxa steroids (see, e.g., Ex. 5 and 6) as the starting material in the above process, the corresponding cis sodium salt is obtained.

The above prepared sodium salts of cis 7-methoxy-1-acetyl-2-methyl-1,2,3,4,9,10-hexahydrophenanthrene-2-carboxylic acid is subjected to the procedure of Example 9 and the corresponding methyl ester is obtained.

EXAMPLE 20

To a mixture of 1 g. of cis 7-methoxy-1-ethyl-2-methyl-1,2,3,4,9,10-hexahydrophenanthrene-2-carboxylic acid and 125 ml. of liquid ammonia is added 0.5 g. of metallic sodium and 7 ml. of aniline. The resulting mixture is stirred for about 1.5 hours. About 2 parts of ammonium chloride is then added with stirring. Then, the reaction mixture is allowed to stand until the ammonia has evaporated. The residue is taken up in water: methylene chloride. The resulting mixture is separated and the aqueous layer is extracted with methylene chloride. The methylene chloride layer and methylene chloride extract are combined, dried and evaporated to furnish cis 7-methoxy-1-ethyl-2-methyl-1,2,3,4,9,10,11,12-octahydrophenanthrene-2-carboxylic acid.

Similarly, by use of the above hydrogenation procedure, the other 1,2,3,4,9,10-hexahydrophenanthrene compounds described herein, see Examples 12, 15; and 19, for example, are converted into the corresponding 11,12-dihydro compounds.

EXAMPLE 21

A mixture of 0.5 g. of α-[2-(6-methoxy-3,4-dihydronaphthylene)-ethyl]-α',γ-dimethyl tetronic acid, 5 mg. of 5% palladium-on-charcoal catalyst and 75 ml. of xylene is heated at reflux for 36 hours. The mixture is then cooled, filtered and the filtrate is evaporated to furnish the corresponding 3,4-dehydro compound of the following formula:

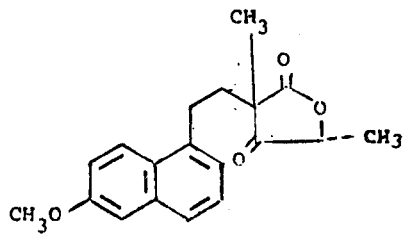

By repeating the above process using the other 3,4-dihydronaphthalene compounds of Example 31 as the starting material, the corresponding 3,4-dehydro or naphthalene compounds are obtained; e.g.α-[2-(3-methyl-6-methoxy-naphthylene)-ethyl]-α',γ-dimethyl tetronic acid; α-[2-(6,8-dihydroxy-naphthylene)-ethyl]-α',γ-dimethyl tetronic acid; α-[2-(6-hydroxy-8-methyl-naphthylene)-ethyl]-α',γ-dimethyl tetronic acid; α-[2-(3-methyl-6,8-dimethoxy-naphthylene-ethyl]-α',γ-dimethyl tetronic acid; and the like, respectively.

By utilizing the above prepared tricyclic compounds in the process of Example 5, the corresponding tetracyclic enol lactones (16-oxa steroids) are obtained, for example, 3-methoxy-15-methyl-16-oxaestra-1,3,5(10),6,8,14-hexaen-17-one, 3-methoxy-7,15-dimethyl-16-oxaestra-1,3,5(10),6,8,14-hexaen-17-one, 1,3-dihydroxy-15-methyl-16-oxaestra-1,3,5(10),6,8,14-hexaen-17-one, 3-hydroxy-1,15-dimethyl-16-oxaestra-1,3,5(10),6,8,14-hexaen-17-one, 1,3-dimethoxy-7,15-dimethyl-16-oxaestra-1,3,5(10),6,8,14-hexaen-17-one, and the like, respectively.

EXAMPLE 22

A mixture of 670 mg. of 3-methoxy-15-methyl-16-oxaestra-1,3,4(10),6,8,14-hexaen-17-one in 70 ml. of dioxane and 45 ml. of 0.1N aqueous sodium hydroxide is allowed to stand at 20°C for 36 hours. The solvents are then removed by evaporation under reduced pressure. The resulting residue is diluted with water and acidified by adding dilute hydrochloric acid. This aqueous mixture is extracted several times with ether. The ether extracts are combined and then evaporated to dryness to yield an oil containing a mixture of trans 7-methoxy-1-acetyl-2-methyl-1,2,3,4-tetrahydrophenanthrene-2-carboxylic acid and 3-methoxy-15ξ-methyl-15ξ-hydroxy-16-oxa-14β-estra-1,3,5(10),6,8-pentaen-17-one. The oil is recrystallized from benzene: hexane to yield the trans acid as the first-crop. Upon concentration of the mother liquors, the 3-methoxy-15ξ-methyl-15ξ-hydroxy-16-oxa-14β-estra-1,3,5(10),6,8-pentaen-17-one is obtained.

The thus-prepared trans acid and lactol are illustrated by the following formulas.

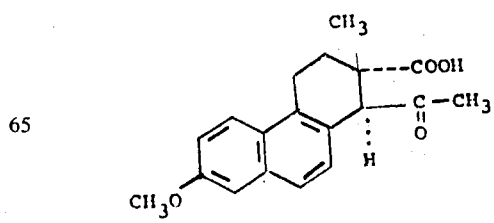

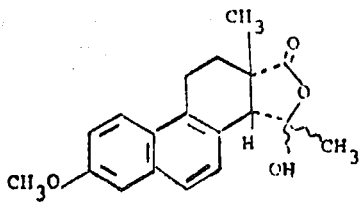

Similarly, using the other 16-oxa steroids obtained in Ex. 5 and 6, the corresponding trans acid and lactol are obtained.

By subjecting the thus-obtained trans keto acid to the reduction procedure of Example 10, there is obtained trans bisdehydrodiosynolic acid.

In a similar manner, the trans keto acids obtained by the process of this example using the 16-oxa steroids of Ex. 5 and 6 as the starting material can be subjected to the process of Example 10 to obtain the trans free acid.

The thus-obtained trans acid, e.g., trans bisdehydrodoisynolic acid can be converted into an enriched mixture of the cis racemate using the procedure of U.S. Pat. No. 2,570,582.

EXAMPLE 23

A mixture of 200 mg. of 3-methoxy-15ξ-methyl-15ξ-hydroxy-16-oxa-14β-estra-1,3,5(10),6,8-pentaen-17-one, 1g. of sodium carbonate, 1ml. of methyl iodide and 20 ml. of dimethyl acetamide is stirred in the dark for 5 hours. After this time, excess mixture is removed by evaporation under reduced pressure. The reaction mixture is then poured into water and the aqueous solution is extracted several times with ether. The combined ether extracts are washed with water, 5% aqueous sodium thiosulfate solution, dried and evaporated to yield the methyl ester of cis 7-methoxy-1-acetyl-1,2,3,4-tetrahydrophenanthrene-2-carboxylic acid.

EXAMPLE 24

Four ml. of dihydropyran is added to a solution of 1 g. of 1,3-dihydroxy-15-methyl-16-oxaestra-1,3,5(10),6,8,14-hexaen-17-one in 15 ml. of benzene. About 1 ml. is removed by distillation to remove moisture and 0.4 g. of p-toluenesulfonic acid is added to the cooled solution. This mixture is allowed to stand at room temperature for 4 days. The mixture is then washed with aqueous sodium bicarbonate solution and water, dried and evaporated to give 1,3-bis(tetrahydropyran-2'-ylxoy)-15-methyl-16-oxaestra-1,3,5(10),6,8,14-hexaen-17-one which can be purified, if desired, by chromatography.

By repeating the above procedure with the exception of using an equivalent amount of other free hydroxy compounds described herein as the starting material, e.g., 1,3-dihydroxy-15-methyl-16-oxaestra-1,3,5(10)8,14-pentaen-17-one; cis 5,7-dihydroxy-1-ethyl-2-methyl-1,2,3,4,9,10-hexahydrophenanthrene-2-carboxylic acid and the methyl ester thereof; cis 5,7-dihydroxy-1-ethyl-2-methyl-1,2,3,4-tetrahydrophenanthrene-2-carboxylic acid and the methyl ester thereof, 1,3-dihydroxy-15ξ-methyl-16-oxa-14β-estra-1,3,5(10),6,8-pentaen-17-one; cis 5,7-dihydroxy-1-ethyl-2-methyl-1,2,3,4,9,10,11,12-octahydrophenanthrene-2-carboxylic acid and the methyl ester thereof; and the like, the corresponding tetrahydropyranyl ethers are obtained.

By repeating the procedure of this example using dihydrofuran in place of dihydropyran, the corresponding tetrahydrofuranyl ethers are obtained.

EXAMPLE 25

A mixture of 1 g. of 1,3-dihydroxy-15-methyl-16-oxaestra-1,3,5(10),6,8,14-hexaen-17-one in 45 ml. of 85% formic acid is stirred for 2 hours at 70°C. The mixture is cooled in ice and filtered to give 1,3-diformyloxy-15-methyl-16-oxaestra-1,3,5-(10),6,8,14-hexaen-17-one.

EXAMPLE 26

A mixture of 1 g. of 1,3-diihydroxy-15-methyl-16-oxaestra-1,3,5-(10),5,8,14-hexaen-17-one, 4ml. of pyridine and 4 ml. of acetic anhydride is allowed to stand at room temperature for 15 hours. The mixture is then poured into ice water and the solid which forms is collected by filtration, washed with water and dried to yield 1,3-diacetoxy-15-methyl-16-oxaestra-1,3,5(10),6,8,14-hexaen-17-one.

By repeating the above procedure using an equivalent amount of other free hydroxy compounds described herein, the corresponding ester is obtained, e.g., 1,3-diacetoxy-15-methyl-16-oxaestra-1,3,5(10),8,14-pentaen-17-one; cis 5,7-diacetoxy-1-ethyl-2-methyl-1,2,3,4,9,10-hexahydrophenanthrene-2-carboxylic acid and the methyl ester thereof; 1,3-diacetoxy-15ξ-methyl-16-oxa-14β-estra-1,3,5,-10),6,8-pentaen-17-one; cis 5,7-diacetoxy-1-ethyl-2-methyl-1,2,3,4-tetrahydrophenanthrene-2-carboxylic acid and the methyl ester thereof; and the like.

EXAMPLE 27

A solution of one chemical equivalent of the methyl ester of cis 7-hydroxy-1-acetyl-2,5-dimethyl-1,2,3,4-tetrahydrophenanthrene-2-carboxylic acid in 30 ml. of benzene is heated to reflux and about 2 ml. removed by distillation to eliminate moisture. The mixture is cooled to room temperature and two chemical equivalents of sodium hydride are added, followed by dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield the methyl ester of cis 7-cyclopentyloxy-1-acetyl-2,5-dimethyl-1,2,3,4-tetrahydrophenanthrene-2-carboxylic acid and which is further purified upon recrystallization from pentane.

By repeating the above procedure using an equivalent amount of cyclohexyl bromide in place of cyclopentyl bromide, there is obtained, the methyl ester of cis 7-cyclohexyloxy-1-acetyl-2,5-dimethyl-1,2,3,4-tetrahydrophenanthrene-2-carboxylic acid.

Similarly, by using an equivalent amount of other free hydroxy compounds described in place of the methyl ester of cis 7-hydroxy-1-acetyl-2,5-dimethyl-1,2,3,4-tetrahydrophenanthrene-2-carboxylic acid in the above process the corresponding cyclopentyl ether and cyclohexyl ether are obtained, e.g., cis 5,7-dicyclopentyloxy-1-ethyl-2-methyl-1,2,3,4-tetrahydrophenanthrene-2-carboxylic acid; cis 7-cyclopentyloxy-1-ethyl-2,5-dimethyl-1,2,3,4-tetrahydrophenanthrene-2-carboxylic acid; cis 7-cyclopentyloxy-2,10-dimethyl-1-ethyl-1,2,3,4-tetrahydrophenanthrene-2-carboxylic acid; cis 5- cyclopentyloxy-1-ethyl-2-methyl-1,2,3,4,9,10-hexahydrophenanthrene-2-carboxylic acid; bis(1,3-cyclopentyloxy)-15-methyl-16-oxaestra-1,2,5(10),6,8,14-hexaen-17-one; trans 5,7-dicyclopentyloxy-1-ethyl-2-methyl-1,2,3,4,9,10-hexahydrophenanthrene-2-carboxylic acid; and the like.

EXAMPLE 28

A mixture of 1 g. of 3-hydroxy-1,15-dimethyl-16-oxaestra-1,3,5(10),8,14-pentaen-17-one, 4 ml. of pyridine and 2 ml. of acetic anhydride is allowed to stand at room temperature for 15 hours. The mixture is then poured into ice water and the solid which forms is collected by filtration, washed with water and dried to yield 3-acetoxy-1,15-dimethyl-16-oxaestra-1,3,5(10),8,14-pentaen-17-one which may be further purified through recrystallization from acetone:hexane.

Similarly, by using an equivalent amount of other lower carboxylic anhydrides in place of acetic anhydride, for example, propionic anhydride, n-butyric anhydride, n-caproic anhydride, trimethylacetic anhydride, and the like, the corresponding ester is obtained.

Likewise, by using an equivalent amount of other free hydroxy compounds described herein in place of 3-hydroxy-1,15-dimethyl-16-oxaestra-1,3,5(10),8,14-pentaen-17-one, e.g., 6,8-dihydroxy-1-tetralone, 6-hydroxy-1-tetralone, cis 5,7-dihydroxy-1-ethyl-2-methyl-1,2,3,4-tetrahydrophenanthrene-2-carboxylic acid, and the like, the corresponding esters are obtained.

EXAMPLE 29

Two milliliters of dihydropyran are added to a solution of 1 g. of 3-hydroxy-1,15-dimethyl-16-oxaestra-1,3,5(10),6,8,14-hexaen-17-one in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-(tetrahydropyran-2'-yloxy)-1,15-dimethyl-16-oxaestra-1,3,5(10),6,8,14-hexaen-17-one which is recrystallized from pentane.

EXAMPLE 30

To a suspension of 5 g. of the methyl ester of cis 7-hydroxy-1-acetyl-2,5-dimethyl-1,2,3,4-tetrahydrophenanthrene-2-carboxylic acid in 25 ml. of acetone is added a solution of 70 g. of potassium hydroxide in 37.5 ml. of water and the stirred mixture is treated dropwise with 19 ml. of dimethyl sulfate. The mixture is stirred for an additional 45 minutes and then poured into dilute hydrochloric acid. The solid which forms is collected by filtration and dried to yield the methyl ester of cis 7-methoxy-1-acetyl-2,5-dimethyl-1,2,3,4-tetrahydrophenanthrene-2-carboxylic acid which is recrystallized from chloroform:methanol.

EXAMPLE 31

A mixture of 1 g. of α-[2-(6-methoxy-1,2,3,4-tetrahydronaphthyliden)-ethyl]-α',γ-dimethyl tetronic acid, 20 ml. of chloroform and 4 drops of hydrochloric acid is allowed to stand at room temperature for two hours. Then the reaction mixture is concentrated to dryness to give α-[2-(6-methoxy-3,4-dihydronaphthylene)-ethyl]-α',γ-dimethyl tetronic acid.

By repeating the above procedure using as the starting material other 1,2,3,4-tetrahydronaphthyliden compounds of Example 4, the corresponding 1,2-dehydro compounds are obtained, e.g., α-[2-(3-methyl-6-methoxy-3,4-dihydronaphthylene)-ethyl]-α',γ-dimethyl tetronic acid; α-[2-(6,8-dihydroxy-3,4-dihydronaphthylene)-ethyl]-α',γ-dimethyl tetronic acid; α-[2-(6-hydroxy-8-methyl-3,4-dihydronaphthylene)-ethyl]-α',γ-dimethyl tetronic acid; α-[2-(3-methyl-6,8-dimethoxy-3,4-dihydronaphthylene)-ethyl]-α',γ-dimethyl tetronic acid; and the like.

EXAMPLE 32

To a solution of 1 g. of cis 5,7-dimethoxy-1-ethyl-2-methyl-1,2,3,4-tetrahydrophenanthrene-2-carboxylic acid in 25 ml. of benzene, there is added with stirring a molar equivalent of potassium bicarbonate. This mixture is stirred until the evolution of carbon dioxide ceases and then the mixture is evaporated to furnish the potassium salt of cis 5,7-dimethoxy-1-ethyl-2-methyl-1,2,3,4-tetrahydrophenanthrene-2-carboxylic acid.

By repeating the above procedure using other acids described herein, see for example Examples 15, 17, 18, 20, 22, 24 and 27, as the starting material, the corresponding potassium acid salts are obtained.

Similarly, by using sodium bicarbonate in the above process in place of potassium bicarbonate, the corresponding sodium acid salts are obtained.

Alternatively, acid salts can be prepared by titrating a solution of the free acid with an alcohol solution of an alkali alkoxide, e.g., sodium methoxide to neutrality.

EXAMPLE 33

By subjecting the cis keto esters of Example 19 to the processes of Examples 10 and 11, the corresponding free cis acids are obtained.

EXAMPLE 34

One gram of trans 7-methoxy-2,10-dimethyl-1-acetyl-1,2,3,4-9,10-hexahydrophenanthrene-2-carboxylic acid is added slowly with stirring to a mixture of 1 gram of sodium borohydride in 60 ml. of ethanol. This mixture is then diluted with water and stirred for about one hour at room temperature. Then, the reaction mixture is acidified by the addition of dilute hydrochloric acid followed by dilution with cold water. The thus-formed solid is collected by filtration, washed with water and dried to give trans 7-methoxy-2,10-dimethyl-1-(1'-hydroxyethyl)-1,2,3,4,9,10-hexahydrophenanthrene-2-carboxylic acid which can be further purified by recrystallization from acetone-hexane.

By repeating the process of this example using an equivalent amount of other 1-acyl containing compounds, see for example Examples 9, 19, 22, 23, 27 and 30, in place of trans 7-methoxy-2,10-dimethyl-1-acetyl-1,2,3,4,9,10-hexahydrophenanthrene-2-carboxylic acid as the starting material, there are obtained the corresponding 1-(1'-hydroxyalkyl) compounds.

EXAMPLE 35

A mixture of 1 g. of 1,3-dimethoxy-15-methyl-16-oxaestra-1,3,5(10),8,14-pentaen-17-one, 0.5 g. of potassium carbonate and 100 ml. of aqueous ethanol (1:1) is refluxed for 4 hours. The mixture is then cooled to room temperature, concentrated to dryness under vacuum and the residue chromatographed on silica gel to yield the potassium salt of trans 5,7-dimethoxy-1-acetyl-2-methyl-1,2,3,4,9,10-hexahydrophenanthrene-2-carboxylic acid.

What is claimed is:

1. A process for the production of a cis keto acid salt selected from those of the following formula

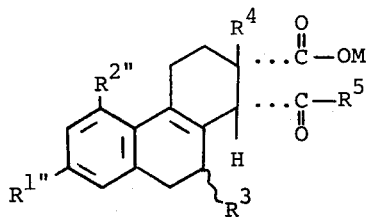

which comprises the steps of:
  a. commingling an isothiouronium salt of the following formula

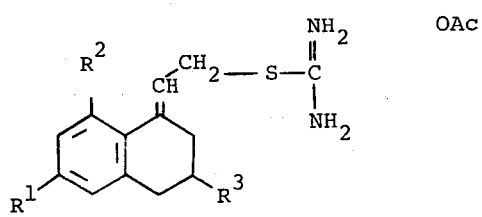

with, and reacting therewith, at about room temperature, a tetronic acid of the following formula

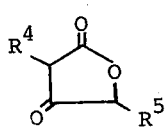

in an aqueous solution of a water-miscible organic solvent to obtain a tricyclic compound of the following formula

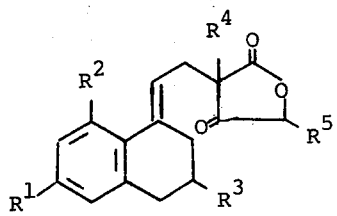

b. cyclizing said tricyclic compound by treatment with acid either alone or in an inert organic solvent at a temperature from about room temperature to about the reflux temperature of said solvent, if any, to obtain a tetracyclic compound of the following formula

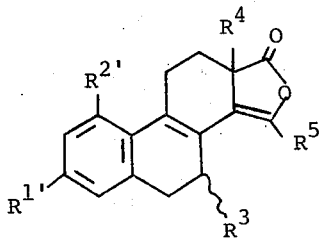

and
  c. treating said tetracyclic compounds with an aqueous watermiscible organic solvent solution of an alkali hydroxide at a temperature of from about 0°C to about room temperature for about 1 to 3 hours to obtain said cis keto acid salt, wherein in the above formulas, M is sodium or potassium;
$R^{1''}$ is hydroxy, lower alkoxy, cyclopentyloxy or cyclohexyloxy;
$R^{2''}$ is hydrogen, or lower alkyl;
$R^3$ is hydrogen, methyl, or ethyl;
$R^4$ is methyl, ethyl or propyl;
$R^5$ is hydrogen, methyl, ethyl or propyl;
$R^{1'}$ is hydroxy, lower alkoxy, cyclopentyloxy, cyclohexyloxy, or lower hydrocarbon carboxylic acyloxy;
$R^{2'}$ is hydrogen, or lower alkyl;
$R^1$ is hydroxy, lower alkoxy, cyclopentyloxy, cyclohexyloxy, lower hydrocarbon carboxylic acyloxy, tetrahydropyran-2-yloxy or tetrahydrofuran-2-yloxy; and
$R^2$ is hydrogen, or lower alkyl.

2. The process of claim 1 including the additional step of dehydrogenating said tetracyclic compound of step (b) in an inert solvent with a palladium catalyst at about the reflux temperature of said inert solvent to obtain the corresponding 9,10-dehydro compound and said 9,10-dehydro compound is thereafter threated according to step (c) to obtain a cis keto acid salt of the following formula:

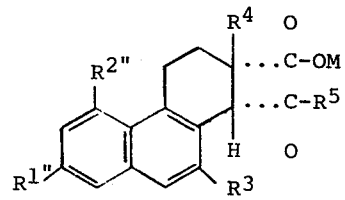

wherein $R^{1''}$, $R^{2''}$, $R^3$, $R^4$, $R^5$, and M are as defined in claim 1.

3. The process of claim 2 wherein the above formulas each of $R^{1''}$, $R^{1'}$ and $R^1$ is methoxy, each of $R^{2''}$, $R^{2'}$, $R^2$ and $R^3$ is hydrogen, each of $R^4$ and $R^5$ is methyl, and M is sodium; said step (a) is conducted at about room temperature and said organic solvent is methanol or ethanol; in step (b) said cyclization is conducted in an inert organic solvent at a temperature of from about room temperature to reflux temperature; said dehydrogenation is conducted in an inert solvent with a palladium catalyst at about reflux temperature; and in step (c) said 9,10-dehydro compound is treated with an aqueous ethanol solution of sodium hydroxide at about room temperature.

4. A compound selected from those of the following formula:

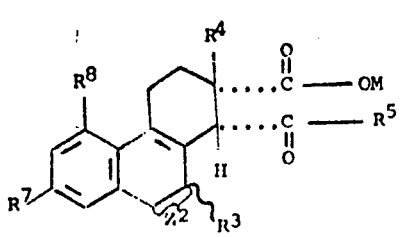

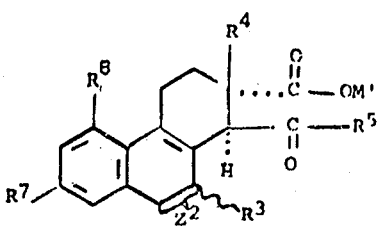

wherein,
M is sodium or potassium;
R³ is hydrogen, methyl or ethyl;
R⁴ is methyl, ethyl or propyl; and
R⁵ is hydrogen, methyl, ethyl or propyl;
R⁷ is, hydroxy, lower alkoxy, cyclopentyloxy, cyclohexyloxy, tetrahydropyran-2-yloxy, or tetrahydrofuran-2-yloxy;
R⁸ is hydrogen, or lower alkyl; and
Z² is a carbon-carbon single or double bond between C-9 and C-10 provided that when R⁷ is lower alkoxy and Z² is a single bond that at least one of R³, R⁵ and R⁸ is other than hydrogen.

5. A compound according to claim 4 wherein Z² is a double bond.

6. A compound selected from those of the following formula:

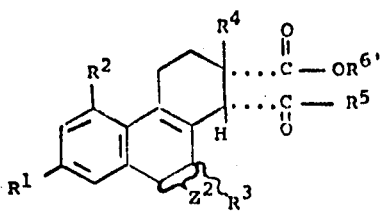

wherein,
R¹ is, hydroxy, lower hydrocarbon carboxylic acyloxy, lower alkoxy, cyclopentyloxy, cyclohexyloxy, tetrahydropyran-2-yloxy or tetrahydrofuran-2-yloxy;
R² is hydrogen, or lower alkyl,
R³ is hydrogen, methyl or ethyl;
R⁴ is methyl, ethyl or propyl;
R⁵ is hydrogen, methyl, ethyl or propyl;
R⁶' is lower alkyl; and
Z² is a carbon-carbon single bond or double bond between C-9 and C-10.

7. A compound according to claim 6 wherein Z² is a double bond.

8. A compound selected from those of the following formula:

wherein,
M' is hydrogen, sodium or potassium;
R³ is hydrogen, methyl or ethyl;
R⁴ is methyl, ethyl or propyl;
R⁵ is hydrogen, methyl, ethyl or propyl;
R⁷ is hydroxy, lower alkoxy, cyclopentyloxy, cyclohexyloxy, tetrahydropyran-2-yloxy, or tetrahydrofuran-2-yloxy;
R⁸ is hydrogen, or lower alkyl; and
Z² is a carbon-carbon single or double bond between C-9 and C-10 provided that when R⁷ is lower alkoxy and Z² is a single bond that at least one of R³, R⁵ and R⁸ is other than hydrogen.

9. A compound selected from those of the following formula:

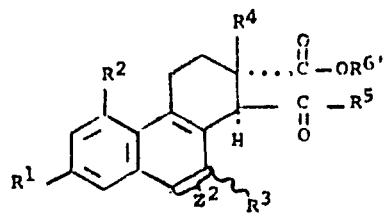

wherein,
R¹ is hydroxy, lower hydrocarbon carboxylic acyloxy, lower alkoxy, cyclopentyloxy, cyclohexyloxy, tetrahydropyran-2-yloxy or tetrahydrofuran-2-yloxy;
R² is hydrogen or lower alkyl;
R³ is hydrogen, methyl or ethyl;
R⁴ is methyl, ethyl or propyl; and
R⁵ is hydrogen, methyl, ethyl or propyl;
R⁶' is lower alkyl; and
Z₂ is a carbon-carbon single bond or double bond between C-9 and C-10.

10. A compound according to claim 7 wherein R² is hydrogen and R⁶' is methyl.

11. As a compound, the sodium or potassium salt of cis 7-methoxy-1-acetyl-2-methyl-1,2,3,4,9,10-hexahydrophenanthrene-2-carboxylic acid.

* * * * *

UNITED STATES PATENT OFFICE
CERTIFICATE OF CORRECTION

Patent No. 3,880,889             Dated June 17, 1975

Inventor(s) JOHN A. EDWARDS et al        (Page 1)

It is certified that error appears in the above-identified patent and that said Letters Patent are hereby corrected as shown below:

Column 1, line 8, change "cia" to --cis--.

Column 2, formula II, change " 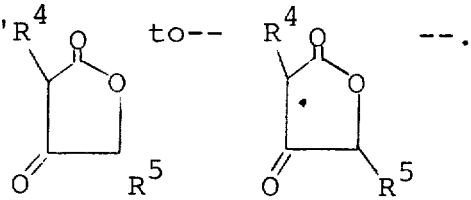 --.

Column 6, line 22, change "ethanedithio" to --ethanedithiol--.
Column 12, line 66, change "methylamino" to --methylamine--.
Column 13, line 25, change "load" to --lead--.
Column 14, line 27, change "tetalone" to --tetralone--.
Column 16, line 60, change "3,8-methyl-dimethyl-1-" to --3,8-dimethyl-1- --.
Column 18, line 10, change "γ-ethyl-β-" to --α-ethyl-γ- --.
Column 18, line 11, change "γ-isopropyl" to --α-isopropyl--.
Column 19, line 21, change "]2-96,8" to --[2-(6,8--.
Column 19, line 28, change "dimethhyl" to --dimethyl--.
Column 20, line 5, change "+8,14" to --8,14--.
Column 20, line 7, change "-16-methyl-" to -- -15-methyl--.
Column 20, line 10, after "1,3,5(10),8,14-pentaen-17-one;", insert --1,3-dihydroxy-13-n-propyl-15-ethyl-16-oxagona-1,3,5(10), 8,14-pentaen-17-one;--.
Column 21, line 27, change "4 benzoquinone" to --4-benzoquinone--.

UNITED STATES PATENT OFFICE
CERTIFICATE OF CORRECTION

Patent No. 3,880,889                    Dated June 17, 1975

Inventor(s) JOHN A. EDWARDS et al          (Page 2)

It is certified that error appears in the above-identified patent and that said Letters Patent are hereby corrected as shown below:

Column 21, line 68, change "2 X 5 X 1.6" to --2 cm. X 5 cm. X 1.6--.

Column 22, line 3, change "tetrahydropphenanthrene" to --tetrahydrophenanthrene--.

Column 23, line 13, change "-15-" to -- -1,15- --.

Column 23, line 66, change "-)," to -- -7,--.

Column 24, line 3, change "15-" to --15$\xi$- --.

Column 24, line 21, change "8tetraen" to --8-tetraen--.

Column 25, line 43, change "ostra" to --estra--.

Column 25, line 47, change "pentean" to --pentaen--.

Column 25, line 60, change "1-6" to --16--.

Column 26, line 1, change "i" to --is--.

Column 30, line 14, change "diihydroxy" to --dihydroxy--.

Column 30, line 15, change "5" to --6--.

Column 30, line 57, change "described in" to --described herein in--.

Column 31, line 4, change "2" to --3--.

UNITED STATES PATENT OFFICE
CERTIFICATE OF CORRECTION

Patent No. 3,880,889        Dated June 17, 1975

Inventor(s) JOHN A. EDWARDS        (Page 3)

It is certified that error appears in the above-identified patent and that said Letters Patent are hereby corrected as shown below:

Column 33, line 28-35, change

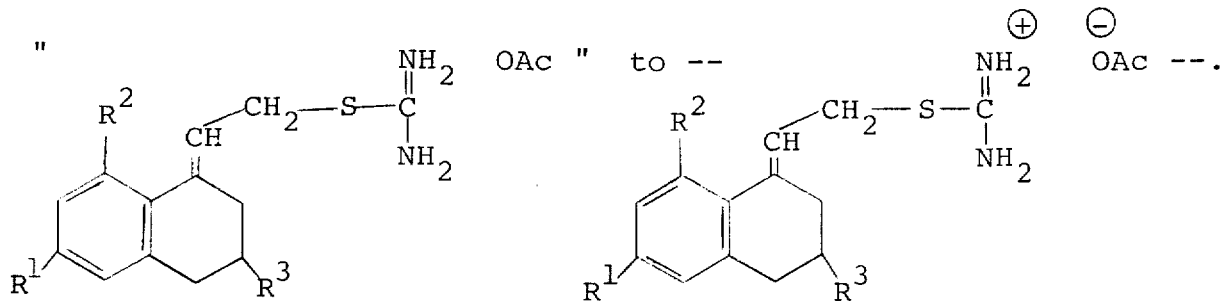

Signed and Sealed this

*nineteenth* Day of *August 1975*

[SEAL]

Attest:

RUTH C. MASON
*Attesting Officer*

C. MARSHALL DANN
*Commissioner of Patents and Trademarks*